United States Patent
Takeda et al.

(10) Patent No.: US 10,082,928 B2
(45) Date of Patent: Sep. 25, 2018

(54) PROVIDING CONTENT TO A USER BASED ON AMOUNT OF USER CONTRIBUTION

(71) Applicant: SONY CORPORATION, Tokyo (JP)

(72) Inventors: Haruto Takeda, Tokyo (JP); Shinya Ohtani, Kanagawa (JP); Ryoki Honjo, Kanagawa (JP); Yoshihiro Wakita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 576 days.

(21) Appl. No.: 14/466,664

(22) Filed: Aug. 22, 2014

(65) Prior Publication Data
US 2015/0067539 A1 Mar. 5, 2015

(30) Foreign Application Priority Data
Sep. 3, 2013 (JP) .................................. 2013-182350

(51) Int. Cl.
*G06F 3/0481* (2013.01)
*H04L 29/08* (2006.01)
*G06F 17/30* (2006.01)
*G06Q 30/02* (2012.01)

(52) U.S. Cl.
CPC .......... *G06F 3/04817* (2013.01); *G06F 17/30* (2013.01); *G06Q 30/0201* (2013.01); *G06Q 30/0282* (2013.01); *H04L 67/10* (2013.01)

(58) Field of Classification Search
CPC . G06F 3/04817; G06F 17/30; G06Q 30/0201; G06Q 30/0282; H04L 67/10
See application file for complete search history.

(56) References Cited

U.S. PATENT DOCUMENTS

| | | | | |
|---|---|---|---|---|
| 7,840,903 | B1* | 11/2010 | Amidon | G06F 3/04815 715/733 |
| 8,128,487 | B2* | 3/2012 | Hamilton, II | A63F 13/12 273/138.1 |
| 9,076,166 | B1* | 7/2015 | Peretz | G06Q 10/00 |
| 2002/0042769 | A1* | 4/2002 | Gujral | G06Q 30/02 705/37 |
| 2002/0111904 | A1* | 8/2002 | Gruber | G06Q 20/10 705/39 |
| 2005/0138564 | A1* | 6/2005 | Fogg | G06F 3/0481 715/745 |
| 2007/0288302 | A1* | 12/2007 | Singh | G06Q 10/00 705/35 |
| 2008/0021720 | A1* | 1/2008 | Glinberg | G06Q 10/00 705/30 |

(Continued)

*Primary Examiner* — Andrea Long
(74) *Attorney, Agent, or Firm* — Chip Law Group

(57) ABSTRACT

There is provided an information processing apparatus including a contribution action detecting unit configured to detect a contribution action representing a contribution from a user to a target, a contribution degree giving unit configured to give the user a contribution degree in accordance with the contribution action, a virtual distance setting unit configured to set a virtual distance which is a virtual distance between the user and the target on the basis of an integrated value of the given contribution degree of the user, and a contribution degree notification screen display control unit configured to control a display of a contribution degree notification screen in which the set virtual distance is visually expressed.

19 Claims, 12 Drawing Sheets

(56) References Cited

U.S. PATENT DOCUMENTS

| | | | | |
|---|---|---|---|---|
| 2010/0020085 A1* | 1/2010 | Bates | A63F 13/12 | 345/474 |
| 2010/0077034 A1* | 3/2010 | Alkov | A63F 13/12 | 709/206 |
| 2010/0332243 A1* | 12/2010 | Weigman | G06Q 10/06375 | 705/1.1 |
| 2011/0173553 A1* | 7/2011 | Karmon | G06Q 10/107 | 715/767 |
| 2012/0054100 A1* | 3/2012 | Pfohl | G06Q 30/0279 | 705/44 |
| 2012/0057794 A1* | 3/2012 | Tsurumi | G06T 11/60 | 382/195 |
| 2012/0084168 A1* | 4/2012 | Adair | G06Q 30/08 | 705/26.3 |
| 2012/0304098 A1* | 11/2012 | Kuulusa | G06F 3/0481 | 715/772 |
| 2014/0173467 A1* | 6/2014 | Clavel | H04L 12/1822 | 715/758 |
| 2014/0370972 A1* | 12/2014 | Mullen | A63F 13/12 | 463/25 |
| 2015/0020003 A1* | 1/2015 | Karam | G06F 3/011 | 715/756 |

* cited by examiner

PROVIDING CONTENT TO A USER BASED ON AMOUNT OF USER CONTRIBUTION

CROSS REFERENCE TO RELATED APPLICATIONS

This application claims the benefit of Japanese Priority Patent Application JP 2013-182350 filed Sep. 3, 2013, the entire contents of which are incorporated herein by reference.

BACKGROUND

The present disclosure relates to an information processing apparatus, an information processing method, and a program.

In recent years, content including an image and/or a voice has been commonly provided to a large number of viewers (users) through a network. As one of methods of evaluating the provided content, a technique to make a contribution from a user to a producer (a creator) of the content is proposed. For example, JP 2001-344530A discloses a technique to realize a contribution action to a creator by a user selecting a contribution button installed on a content display screen.

SUMMARY

Here, a contribution action from a user to a creator (a target) can be said to be an example of a contribution action representing a contribution from the user to the target, and the amount of contribution can be said to be an example of an index representing the degree of contribution from the user to the target. For example, by being presented with the magnitude of the degree of contribution to the target, the user can recognize the degree of contribution of the user himself or herself, and can have a motivation to continue the contribution action to the target.

In view of such circumstances, a technology has been demanded which presents the user with the degree of contribution and by which the user can recognize the degree of contribution more intuitively. Accordingly, the present disclosure proposes a novel and improved information processing apparatus, information processing method, and program which enable the user to recognize the degree of contribution to the target more intuitively.

According to an embodiment of the present disclosure, there is provided an information processing apparatus including a contribution action detecting unit configured to detect a contribution action representing a contribution from a user to a target, a contribution degree giving unit configured to give the user a contribution degree in accordance with the contribution action, a virtual distance setting unit configured to set a virtual distance which is a virtual distance between the user and the target on the basis of an integrated value of the given contribution degree of the user, and a contribution degree notification screen display control unit configured to control a display of a contribution degree notification screen in which the set virtual distance is visually expressed.

According to another embodiment of the present disclosure, there is provided an information processing method including detecting a contribution action representing a contribution from a user to a target, giving the user a contribution degree in accordance with the contribution action, setting a virtual distance which is a virtual distance between the user and the target on the basis of an integrated value of the given contribution degree for each user, and controlling, by a processor, a display of a contribution degree notification screen in which the set virtual distance is visually expressed.

According to another embodiment of the present disclosure, there is provided a program for causing a computer to realize a function of detecting a contribution action representing a contribution from a user to a target, a function of giving the user a contribution degree in accordance with the contribution action, a function of setting a virtual distance which is a virtual distance between the user and the target on the basis of an integrated value of the given contribution degree for each user, and a function of controlling a display of a contribution degree notification screen in which the set virtual distance is visually expressed.

According to another embodiment of the present disclosure, a contribution action representing a contribution from a user to a target is detected, and the degree of contribution in accordance with the contribution action is given to the user. Further, on the basis of an integrated value of the given contribution degree for each user, a virtual distance which is a virtual distance between the user and the target is set, and the display of a contribution degree notification screen on which the set virtual distance is visually represented is controlled, so that the a notification of the degree of contribution is sent to the user. Accordingly, the user can recognize the sense of distance between the user and the target visually by checking the display on the contribution degree notification screen, and thus, the user can recognize the degree of contribution of the user to the target intuitively.

According to one or more of embodiments of the present disclosure, as described above, it becomes possible for the user to recognize the degree of contribution to the target more intuitively. Note that the above described effects are not necessarily limiting. That is, the technology according to the present disclosure can exhibit any of the effects described in the specification or other effects that are apparent to a person skilled in the art from the descriptions in the specification, along with the above effects or instead of the above effects.

DETAILED DESCRIPTION OF THE EMBODIMENT(S)

Figure 1:
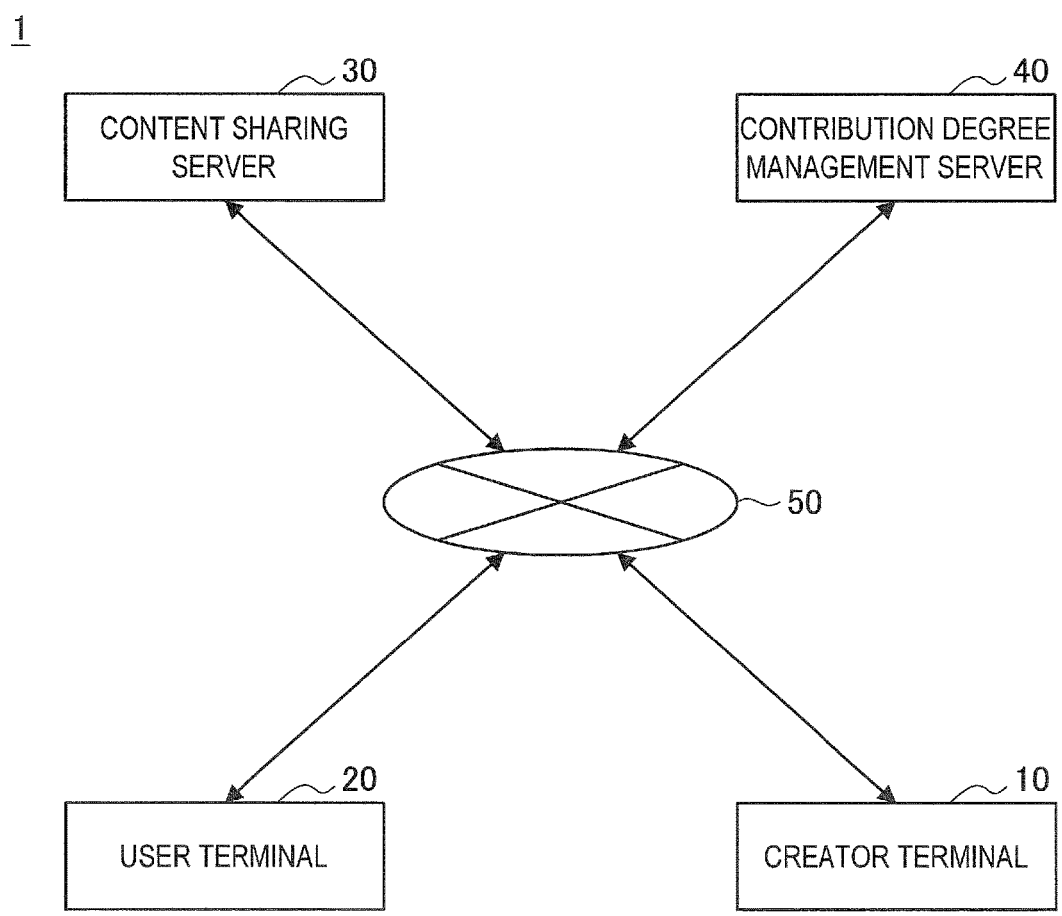
FIG. 1 is a block diagram showing a schematic configuration of a contribution degree management system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Configuration of System
2. Configuration of Apparatus
3. Display Examples of Contribution Degree Notification Screen
4. Processing Procedure in System
5. Hardware Configuration
6. Supplementary Explanation <1. Configuration of System>

First, an overview of a contribution degree management system according to an embodiment of the present disclosure will be described with reference to FIG. 1. FIG. 1 is a block diagram showing a schematic configuration of the contribution degree management system according to an embodiment of the present disclosure. In the contribution degree management system according to the present embodiment, a contribution degree representing the degree of contribution from a user to a target is managed, and in addition, the contribution degree is notified to the user. Here, in the following description, as an example of the present embodiment, a case in which the contribution degree management system is used for a content sharing system in which content is shared by a plurality of users will be shown. In this case, for example, the target is a creator of the content, and the contribution degree is an index representing the degree of contribution made by a viewer (a user) of the content to the creator. However, the present embodiment is not limited to this example, and the contribution degree management system according to the present embodiment can be used for any other system which can generate a situation in which the user reaches the target in accordance with the degree of contribution to the target.

Referring to FIG. 1, a contribution degree management system 1 according to an embodiment of the present disclosure includes a creator terminal 10, a user terminal 20, a content sharing server 30, and a contribution degree management server 40. The creator terminal 10, the user terminal 20, the content sharing server 30, and the contribution degree management server 40 are connected to one another through a wired or wireless network 50 so that various pieces of information can be transmitted to and received from one another. Note that each of the creator terminal 10, the user terminal 20, the content sharing server 30, and the contribution degree management server 40 can be achieved by a hardware configuration of an information processing apparatus that will be described later.

The creator terminal 10 can be any of a variety of terminal apparatuses such as a personal computer (PC), a tablet terminal, a smartphone, a game machine, and a media player. The creator terminal 10 is configured to be able to execute software such as moving image editing software or music editing software so that a creator can produce various content items. The creator can register the content produced by himself or herself in the content sharing system through the creator terminal 10.

The user terminal 20 can be any of a variety of terminal apparatuses such as a PC, a tablet terminal, a smartphone, a game machine, and a media player. The user terminal 20 is configured to be able to execute software such as moving image reproducing software or music reproducing software so that a user can view various content items. The user can access the content sharing system through the user terminal 20 and can view the content registered by the creator.

The content sharing server 30 generally manages the content sharing system and performs various processes in the system. For example, the content sharing server 30 manages the content registered by the creator in association with the creator. Further, for example, the content sharing server 30 can receive a user's request to view desired content, and can transmit the content to the user terminal 20. Furthermore, the content sharing server 30 may manage account information of the creator and the user (information by which a creator and a user can be identified, such as ID or password) and may manage content in accordance with the account information by transmitting specific content to a specific user, for example.

The contribution degree management server 40 manages the contribution degree representing the degree of contribution from the user to the creator of the content shared by the content sharing system. Specifically, the contribution degree management server 40 detects a contribution action representing a contribution from the user to the creator. Further, the contribution degree management server 40 gives the user the contribution degree on the basis of the contribution action. Furthermore, the contribution degree management server 40 can notify the user of the contribution degree.

Here, the magnitude of the degree of contribution from the user to the creator can be compared to the perspective of the distance between the user and the creator. For example, a user having a larger degree of contribution to the creator can be said to be a user having a shorter distance with the creator. Accordingly, in the present embodiment, when the contribution degree is notified to the user, the contribution degree management server 40 sets a virtual distance between the user and the creator (hereinafter referred to as virtual distance) in accordance with the contribution degree. Then, the contribution degree management server 40 controls the display of a contribution degree notification screen on which the virtual distance is visually expressed. The user can recognize the sense of distance between the user and the creator visually by checking the display on the contribution degree notification screen, and accordingly, the user can recognize the degree of contribution of the user to the creator intuitively. Note that functional configurations of the contribution degree management server 40 will be described in detail in <2. Configuration of Apparatus> below.

Figure 2:
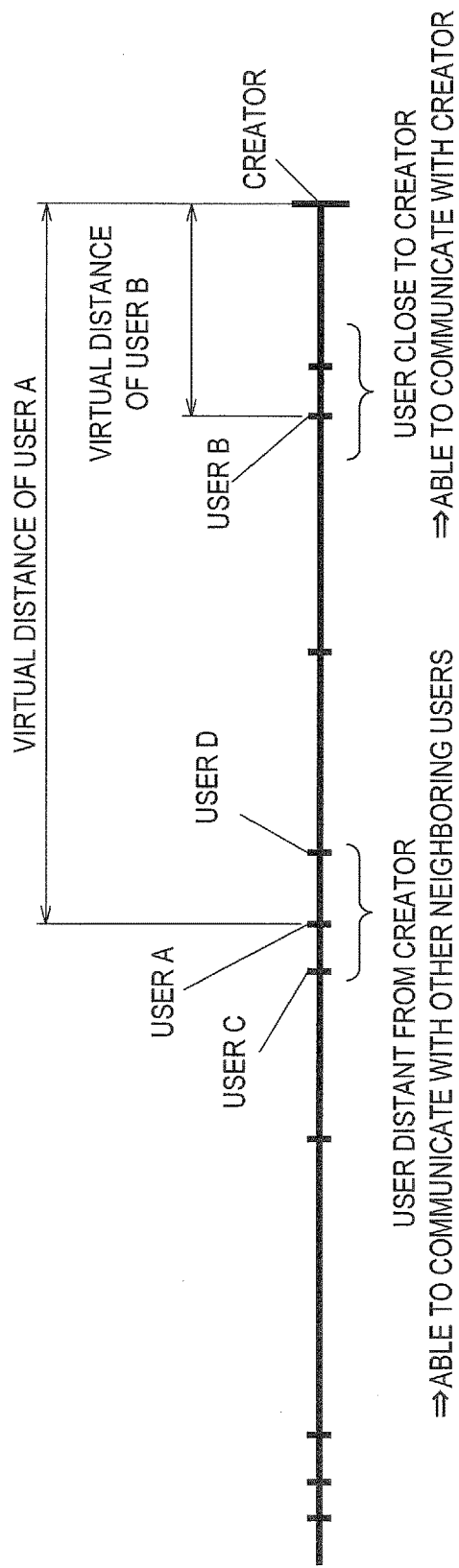
FIG. 2 shows a relation between a contribution degree and a virtual distance.

Here, the relation between the contribution degree and the virtual distance will be described in detail with reference to FIG. 2. FIG. 2 shows the relation between the contribution degree and the virtual distance. In FIG. 2, the magnitude of the contribution degree is represented by a number line on which users are shown. A user closer to the right end of the number line has a larger degree of contribution, and the creator is located on the right end of the number line. The virtual distance may be a distance from the creator to each user on the number line. For example, a user A has a relatively small degree of contribution and is accordingly located away from the creator. Therefore, a relatively long virtual distance is set for the user A. On the other hand, since a user B has a relatively large degree of contribution, the user B is located closer to the creator. Therefore, a relatively short virtual distance is set for the user B. In this manner, in the present embodiment, a user having a larger degree of contribution can be said to be a user having a shorter virtual distance to the creator.

Here, the virtual distance of each user is set on the basis of an integrated value of degree of contribution made by each user within a certain period. Accordingly, in a case in which the user A performs a contribution action and obtains a contribution degree, the virtual distance to the creator becomes shorter accordingly. Further, the display of the contribution degree notification screen changes in a manner that the user becomes closer to the creator in accordance with the change in the virtual distance. In this manner, the visual notification that the virtual distance to the creator becomes shorter can give the user a sense of accomplishment of the contribution action, which leads to an increase in motivation to perform another contribution action.

Further, the contribution degree notification screen may display information on other users having a virtual distance within a certain range (that is, other users having an integrated value of the contribution degree within a certain range). For example, for the user A shown in FIG. 2, the contribution degree notification screen may display information on a user C and a user D, who are users located at substantially the same virtual distance as the user A. For example, information on virtual distances of the user C and the user D can be notified to the user A. In this manner, in the present embodiment, the sense of distance to the creator may be expressed by the magnitude of the virtual distance to other users on the contribution degree notification screen. Further, since information on the users located at substantially the same virtual distance as a user is displayed on the contribution degree notification screen, the user will compete with the other users to obtain more contribution degrees, arousing more contribution actions.

In the present embodiment, a community may be created in accordance with the virtual distance, and a communication service may be provided for the community. For example, for a plurality of users having a virtual distance within a certain range, a communication service which enables the users to communicate may be provided. The communication service includes exchange of massages, for example. Here, since the contribution degree is given by the performance of a contribution action to the creator, the integrated value of the contribution degree can be an index indicating a user's enthusiasm for the creator. In the present embodiment, a community is created in accordance with the virtual distance, and thus, the community can be of fans of the same creator having substantially the same degree of enthusiasm. Further, a communication service to the community increases a sense of fellowship among the users, evoking more contribution actions due to synergistic effects among the users.

In the present embodiment, the creator and a user having a virtual distance shorter than a certain value, that is, a user located at a relatively short distance to the creator, may be provided with a communication service which enables the user and the creator to communicate. Such a communication service motivates a desire to communicate with the creator directly, promoting more contribution actions performed by the user.

The relation between the contribution degree and the virtual distance in the present embodiment has been described above with reference to FIG. 2. Note that a specific display of the contribution degree notification screen based on the virtual distance and the communication service will be described in detail in <3. Display Examples of Contribution Degree Notification Screen> below.

<2. Configuration of Apparatus>

Figure 3:
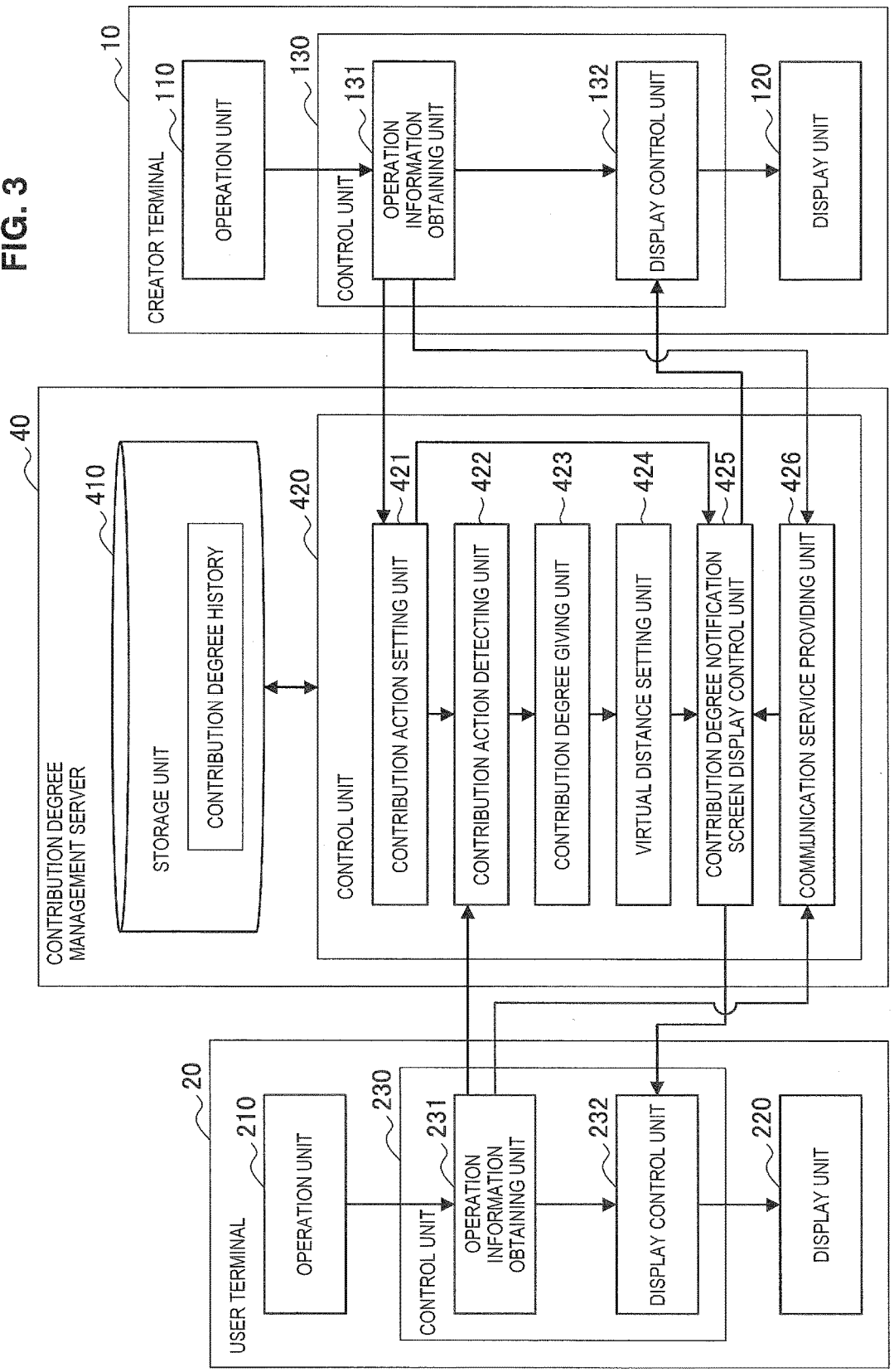
FIG. 3 is a functional block diagram showing functional configurations of apparatuses included in a contribution degree management system according an embodiment.

Next, functional configurations of apparatuses included in the contribution degree management system 1 according to an embodiment of the present disclosure will be described with reference to FIG. 3. FIG. 3 is a functional block diagram showing functional configurations of apparatuses included in the contribution degree management system 1 according the present embodiment. Note that in FIG. 3, among the apparatuses included in the contribution degree management system 1, the content sharing server 30 is omitted, and only the creator terminal 10, the user terminal 20, and the contribution degree management server 40 are shown. The content sharing server 30 is configured to be able to perform each process described with reference to FIG. 1 and FIG. 11, which will be described later, and can be achieved by functional configurations of a management server for a common content sharing system, for example. Further, the functional configurations shown in FIG. 3 are simplified for the description of the present embodiment, and the respective apparatuses may further include functional configurations that are not shown. Since the functional configurations that are not shown can be known and common functional configurations of the respective apparatuses, a detailed description thereof is omitted here.

For example, various pieces of information may be transmitted and received between the creator terminal 10, the user terminal 20, and the contribution degree management server 40 through a wired or wireless network (not shown) by use of a communication device (not shown) included in each apparatus. Note that the creator terminal 10, the user terminal 20, the content sharing server 30, and the contribution degree management server 40 are not necessarily achieved by a single information processing apparatus and may be achieved by cooperation of a plurality of information processing apparatuses that are mutually connected through a network.

First, functional configurations of the contribution degree management server 40 will be described. The contribution degree management server 40 includes a storage unit 410 and a control unit 420.

The storage unit 410 is a storage means that stores various pieces of information to be processed in the contribution degree management server 40. The storage unit 410 stores information to be used in various processes in the control unit 420 and the results of various processes in the control unit 420. The control unit 420 can obtain various pieces of information stored in the storage unit 410 to execute each process by use of the information. The storage unit 410 is formed by any of a variety of storage devices such as a magnetic storage device (e.g., hard disk drive (HDD)), a semiconductor storage device, and an optical storage device. In the present embodiment, the storage unit 410 stores information on the contribution degree given to each user. In this case, the storage unit 410 may store, as history, information on the contribution degree given to each user within a certain period. The history of information on the contribution degree can be stored by accumulating the results of the contribution degree given by a contribution degree giving unit 423, which will be described later, for a certain period.

The control unit 420 controls a variety of processes performed in the contribution degree management server 40. The control unit 420 includes a contribution action setting unit 421, a contribution action detecting unit 422, the contribution degree giving unit 423, a virtual distance setting unit 424, a contribution degree notification screen display control unit 425, and a communication service providing unit 426. Functions of the control unit 420 including these functions are achieved by a processor such as a CPU (central processing unit) operating in accordance with a program stored in memory.

The contribution action setting unit 421 sets a contribution action representing a contribution from the user to the target. For example, the contribution action setting unit 421 can set, as the contribution action, a user's action of contributing money to a creator, a user's action of purchasing content produced by the creator, a user's action of advertising content produced by the creator on social media, a user's action of participating in an event held by the creator, and the like. Note that the contribution action according to the present embodiment is not limited to those examples, and any other action representing a contribution to a creator may be set as the contribution action. Further, in the present embodiment, the contribution action setting unit 421 may receive operation information which is information obtained by an operation information obtaining unit 131 of the creator terminal 10, which will be described later, the operation information being related to an operation input performed by the creator, and may set the contribution action on the basis of contribution action information on the contribution action included in the operation information. The creator sets the contribution action in this manner, and accordingly, the user can be aroused to perform an action that is more preferable to the creator.

Further, in the present embodiment, the contribution action setting unit 421 may set the contribution action on the basis of various pieces of information other than the operation information of the creator. For example, the contribution action setting unit 421 can anticipate an action that interests the user on the basis of the history of operation information obtained by an operation information obtaining unit 231 of the user terminal 20, which will be described later, the operation information being related to an operation input performed by the user, and can set the action as the contribution action. Specifically, for example, on the basis of the history of operation information of the user, with respect to a user who often purchases a sound source of content (e.g., CDs), the contribution action setting unit 421 may set the purchase of the sound source of content as the contribution action; with respect to a user who has previously participated in an event held in a specific area, the contribution action setting unit 421 may set participation in an event that will be held in the area as the contribution action. Since the contribution action setting unit 421 anticipates the action that interests the user and sets the action as the contribution action in this manner, the user can be more aroused to perform the contribution action. The contribution action setting unit 421 provides information on the set contribution action to the contribution action detecting unit 422.

The contribution action detecting unit 422 detects the contribution action from among various actions performed by the user on the basis of the set contribution action. Specifically, the contribution action detecting unit 422 receives the operation information obtained by the operation information obtaining unit 231 of the user terminal 20, which will be described later, the operation information being related to an operation input performed by the user, and detects an action corresponding to the set contribution action from among pieces of the operation information. The contribution action detecting unit 422 provides information on the detected contribution action to the contribution degree giving unit 423.

Here, among contribution actions, as for an action that can be performed on the network through the user terminal 20, such as the action of contributing money or the action of purchasing content, information showing that such an action is performed can be included in the operation information, and accordingly, the contribution action detecting unit 422 can detect the contribution action on the basis of the operation information. On the other hand, as for an action that can be performed in the real world not through the user terminal 20, such as the action of participating in an event, information showing that such an action is performed may not be included in the operation information. Accordingly, in the present embodiment, the user may report the fact that the contribution action is performed through the user terminal 20. Information of the fact that the contribution action is performed is transmitted to the contribution action detecting unit 422 as the operation information, and thus, the contribution action detecting unit 422 can detect the contribution action.

Further, in the present embodiment, also in a case in which a user performs the contribution action together with other users, such as a case in which the user makes a joint-purchase of a product related to the creator with other users or a case in which the user participates in an event held by the creator with other users, the contribution action detecting unit 422 may detect the contribution action as the contribution action performed by the user. In this case, the contribution action detecting unit 422 may detect the user's contribution action on the basis of operation information of the other users related to the contribution action, for example.

The contribution degree giving unit 423 gives the user the contribution degree in accordance with the detected contribution action. For example, the value of the contribution degree given to the user is set in accordance with the content of the contribution action, and the contribution degree giving unit 423 can give the value corresponding to the contribution action as the contribution degree in accordance with the content of the detected contribution action. Note that the value of the contribution degree in accordance with the contribution action may be set at the same time when the creator sets the contribution action; alternatively, a certain value may be set in advance for a typical contribution action. Further, the contribution degree giving unit 423 may give a plurality of users the contribution degree, and may store information on the given contribution degree in association with the respective users in the storage unit 410. Furthermore, the contribution degree giving unit 423 may give the user the contribution degree and also calculate the integrated value of contribution degree that is given within a certain period for each user. The storage unit 410 can store history of the contribution degree given to the respective users. The contribution degree giving unit 423 provides information on the contribution degree given to the user, such as information on the integrated value of the contribution degree given to the user within a certain period, to the virtual distance setting unit 424.

The virtual distance setting unit 424 sets the virtual distance which is a virtual distance between the user and the creator on the basis of the integrated value of the contribution degree given to the user. In the present embodiment, a user having a higher degree of contribution to the creator is regarded as being closer to the creator. Accordingly, the virtual distance setting unit 424 sets the virtual distance in a manner that the virtual distance is in inverse proportion to the integrated value of the contribution degree given to the user. The virtual distance setting unit 424 provides information on the set virtual distance to the contribution degree notification screen display control unit 425.

Here, setting of the virtual distance by the virtual distance setting unit 424 will be described in more detail. For example, the virtual distance setting unit 424 may set a certain value temporarily as the contribution degree to reach the creator and calculate the difference between the certain value and the integrated value of the contribution degree of each user so as to set the difference as the value of the virtual distance of the user. In a case in which the integrated value of the contribution degree of the user is larger than the certain value, the virtual distance setting unit 424 may set the value of the virtual distance to a value smaller than the certain value (e.g., zero). The certain value is a threshold value for determining whether the user has reached the creator or not, and a state in which the value of the virtual distance is set to a value smaller than the certain value means a state in which the user has reached the creator. In this manner, in the present embodiment, the virtual distance setting unit 424 may set the virtual distance on the basis of an absolute evaluation of the integrated value of the contribution degree of each user. The virtual distance set by the absolute evaluation corresponds to a distance between the creator's position and each user's position on the number line representing the magnitude of the contribution degree shown in FIG. 2.

However, the present embodiment is not limited to this example, and the virtual distance setting unit 424 may set the virtual distance on the basis of a relative evaluation of the integrated value of the contribution degree in comparison with other users. In a case in which the virtual distance is set on the basis of the relative evaluation of the integrated value of the contribution degree in comparison with other users, the virtual distance setting unit 424 sets the value of the virtual distance of a user having the largest integrated value of the contribution degree or of a certain number of users having large integrated values of the contribution degrees in descending order, for example, to a value that is smaller than the certain value as the threshold value for determining whether the user(s) has reached the creator or not. Further, on the basis of a user having the value of the virtual distance that is set to a value smaller than the certain value, the virtual distance setting unit 424 may set the virtual distances for the other users in a manner that a user having a larger integrated value of the contribution degree has a shorter virtual distance.

A manager of the contribution degree management system 1 may set as appropriate whether the virtual distance setting unit 424 sets the virtual distance on the basis of the absolute evaluation of the integrated value of the contribution degree of each user or on the basis of the relative evaluation of the integrated value of the contribution degree in comparison with other users. For example, in a case in which the number of users who can reach the creator is not limited to a particular number, the virtual distance may be set on the basis of the absolute evaluation. On the other hand, in a case in which the number of users who can reach the creator is limited to a particular number, the virtual distance is preferably set on the basis of the relative evaluation. The virtual distance set on the basis of the relative evaluation of the integrated value of the contribution degree in comparison with other users enables only the limited number of users to reach the creator, and accordingly, competitive consciousness for the contribution action can be aroused among the users.

The contribution degree notification screen display control unit 425 controls the display of the contribution degree notification screen on which the virtual distance is visually expressed. The contribution degree notification screen display control unit 425 can control the display of the contribution degree notification screen in the user terminal 20, and the contribution degree notification screen can be checked by the user. The contribution degree notification screen display control unit 425 sets a certain position on the screen as a virtual point representing the creator's position, for example (hereinafter, the certain point is also referred to as creator setting point). Further, the contribution degree notification screen display control unit 425 displays a user icon representing the user in a manner that the distance between the user icon and the creator setting point corresponds to the virtual distance of the user, thereby visually expressing the virtual distance on the contribution degree notification screen. At the creator setting point, a creator icon representing the creator may be displayed. In this manner, in the present embodiment, on the contribution degree notification screen, the magnitude of the degree of contribution from the user to the creator is expressed as the perspective of the distance between the user and the creator so that the user can recognize the contribution degree of the user more intuitively by checking the display on the contribution degree notification screen.

Further, the contribution degree notification screen display control unit 425 may also control the display of the contribution degree notification screen in the creator terminal 10. The creator can check information on the user who has performed the contribution action to the creator and can recognize the user having a large degree of contribution to the creator intuitively by checking the display on the contribution degree notification screen.

Furthermore, as described above, in the present embodiment, the contribution degree giving unit 423 may give the contribution degree to a plurality of users. Further, the virtual distance setting unit 424 may set the virtual distance on the basis of the relative evaluation of the integrated value of the contribution degree in comparison with other users for each user. The contribution degree notification screen display control unit 425 may express the contribution degrees of the plurality of users as relative virtual distances between the respective users and the creator on the contribution degree notification screen on the basis of the virtual distances set by the relative evaluation. For example, the contribution degree notification screen display control unit 425 may display a plurality of user icons representing the respective users on the contribution degree notification screen, and the plurality of user icons can be displayed at positions having different distances from the creator setting point in accordance with the relative virtual distances. In this manner, the display of the plurality of user icons at different positions in accordance with the magnitude of the contribution degree enables visual expression of the magnitude of the relative contribution degrees of the users as virtual distances from the creator.

The communication service providing unit 426 provides a communication service to at least other users having the virtual distance within a certain range (that is, other users having the integrated value of the contribution degree within a certain range). The communication service may be exchange of messages between or among the users, for example. Further, the exchange of messages may be displayed on the contribution degree notification screen by the contribution degree notification screen display control unit 425. In this manner, in the present embodiment, the users can communicate on the contribution degree notification screen. Further, the communication service providing unit 426 may provide a communication service between the creator and the user. For example, the communication service providing unit 426 may provide a communication service to a user having the virtual distance smaller than a certain value (that is, a user closer to the creator) and the creator. Note that information such as the massages in the communication service provided by the communication service providing unit 426 can be included in the operation information obtained by the operation information obtaining unit 131 and the operation information obtaining unit 231 of the creator terminal 10 and the user terminal 20, which will be described later.

The functional configurations of the contribution degree management server 40 have been described above. Note that specific display examples of the contribution degree notification screen and specific examples of the communication service provided by the communication service providing unit 426 will be described in detail in <3. Display Examples of Contribution Degree Notification Screen> below.

Next, functional configurations of the user terminal 20 will be described. Referring to FIG. 3, the user terminal 20 includes an operation unit 210, a display unit 220, and a control unit 230.

The operation unit 210 is an input interface to which the user performs various operation inputs. The user can input various pieces of information or instructions to the user terminal 20 via the operation unit 210. The operation unit 210 is formed by any of various input devices such as a mouse, a keyboard, and a touch panel. The operation unit 210 provides operation information, which is information on the operation input performed by the user, to the operation information obtaining unit 231 of the control unit 230, which will be described later.

The display unit 220 is an output interface that visually notifies the user of various pieces of information by displaying the information in various forms such as texts, images, charts, and graphs, on a display screen. The display unit 220 is formed by any of various display devices such as a liquid crystal display (LCD) and an organic electro-luminescence (EL) display. Note that in a case in which the operation unit 210 includes a touch panel, the operation unit 210 and the display unit 220 may be integrally formed. In the present embodiment, the display of the display unit 220 is controlled by a display control unit 232 of the control unit 230, which will be described later. For example, the display unit 220 displays the above described contribution degree notification screen under control of the display control unit 232. Further, the display unit 220 may display a reproduction screen on which content transmitted from the content sharing server 30 is reproduced under control of the display control unit 232.

Here, the contribution degree notification screen displayed by the display unit 220 may be a display screen on a graphical user interface (GUI) for the user to perform various operation inputs. For example, the contribution degree notification screen can display a user icon representing a user and a creator icon representing a creator in order to visually express the virtual distance between the user and the creator. Further, in the present embodiment, a communication service for communication with other users and/or the creator may be provided to the user by the above described communication service providing unit 426, and for example, the contribution degree notification screen may display information such as messages exchanged in the communication service. The user performs a certain operation on the contribution degree notification screen to input various pieces of information related to the display of the user icon or the communication service.

The control unit 230 controls a variety of processes performed in the user terminal 20. The control unit 230 includes the operation information obtaining unit 231 and the display control unit 232. Functions of the control unit 230 including functions of the operation information obtaining unit 231 and the display control unit 232 are achieved by a processor such as a CPU operating in accordance with a program stored in memory, for example.

The operation information obtaining unit 231 obtains operation information which is information on an operation input performed by the user, which is inputted via the operation unit 210. The operation information can include, for example, information indicating operations such as movement and selection of a variety of icons displayed as GUIs or character information inputted by the user. Here, in a case in which the operation unit 210 includes a pointing device such as a mouse, for example, operations such as the movement and selection of a variety of icons displayed as GUIs can be achieved via an operator such as a pointer (cursor) displayed in a GUI. Further, in a case in which the operation unit 210 includes a touch panel, operations such as the movement and selection with respect to icons can be executed directly by touching the icons with a user's finger, for example.

In the present embodiment, the operation information obtaining unit 231 obtains, as the operation information, various pieces of information inputted by the user on the contribution degree notification screen. The various pieces of information inputted by the user on the contribution degree notification screen may be various pieces of information related to the display of the user icon or the communication service, for example. However, the operation information obtained by the operation information obtaining unit 231 is not limited to inputs of various pieces of information on the contribution degree notification screen but may include information on various operation inputs performed by the user on the user terminal 20. For example, the operation information includes various pieces of information showing that the contribution action is performed. The operation information obtaining unit 231 transmits the obtained operation information to the contribution action detecting unit 422 and/or the communication service providing unit 426 of the contribution degree management server 40. Further, the operation information obtaining unit 231 can obtain information showing that the user has selected one content item from among content items that are registered in the content sharing server 30, and can transmit a request for the selected content item to the content sharing server 30.

The display control unit 232 controls the display unit 220 and causes the display unit 220 to display various pieces of information. In the present embodiment, the display control unit 232 causes the display unit 220 to display the contribution degree notification screen. Note that, as described above, the display of the contribution degree notification screen can be controlled by the contribution degree notification screen display control unit 425 of the contribution degree management server 40. The display control unit 232 can cause the display unit 220 to display the contribution degree notification screen on the basis of various pieces of information transmitted from the contribution degree notification screen display control unit 425. Further, the display control unit 232 can cause a reproduction screen on which content transmitted from the content sharing server 30 is reproduced to be displayed. Note that the display control unit 232 may further perform display control that is performed in a common information processing apparatus, such as the movement of the display of a pointer in a GUI, on the basis of the operation information obtained by the operation information obtaining unit 231, for example.

Next, functional configurations of the creator terminal 10 will be described. Referring to FIG. 3, the creator terminal 10 includes an operation unit 110, a display unit 120, and a control unit 130.

The operation unit 110 is an input interface to which the creator performs various operation inputs. The creator can input various pieces of information or instructions to the creator terminal 10 via the operation unit 110. The operation unit 110 is formed by any of various input devices such as a mouse, a keyboard, and a touch panel. The operation unit 110 provides operation information, which is information on the operation input performed by the creator, to the operation information obtaining unit 131 of the control unit 130, which will be described later.

The display unit 120 is an output interface that visually notifies the creator of various pieces of information by displaying the information in various forms such as texts, images, charts, and graphs, on a display screen. The display unit 120 is formed by any of various display devices such as a LCD and an organic EL display. Note that in a case in which the operation unit 110 includes a touch panel, the operation unit 110 and the display unit 120 may be integrally formed. In the present embodiment, the display of the display unit 120 is controlled by a display control unit 132 of the control unit 130, which will be described later. For example, the display unit 120 displays the above described contribution degree notification screen under control of the display control unit 132.

Here, the contribution degree notification screen displayed by the display unit 120 may be a display screen in a GUI for the creator to perform various operation inputs. For example, the contribution degree notification screen can display a user icon representing a user and a creator icon representing a creator in order to visually express the virtual distance between the user and the creator. Further, in the present embodiment, a communication service for communication with the user may be provided to the creator by the above described communication service providing unit 426, and for example, the contribution degree notification screen may display information such as messages exchanged between the creator and the user in the communication service. The creator performs a certain operation on the contribution degree notification screen to input various pieces of information related to the display of the creator icon and the communication service.

The control unit 130 controls a variety of processes performed in the creator terminal 10. The control unit 130 includes the operation information obtaining unit 131 and the display control unit 132. Functions of the control unit 130 including functions of the operation information obtaining unit 131 and the display control unit 132 are achieved by a processor such as a CPU operating in accordance with a program stored in memory, for example.

The operation information obtaining unit 131 obtains operation information which is information on an operation input performed by the creator, which is inputted via the operation unit 110. The operation information can include, for example, information indicating operations such as movement and selection of a variety of icons displayed as GUIs or character information inputted by the creator, as in the case of the operation information obtained by the operation information obtaining unit 231 of the user terminal 20. In the present embodiment, the operation information obtaining unit 131 obtains various pieces of information inputted by the creator on the contribution degree notification screen as the operation information. The various pieces of information inputted by the creator on the contribution degree notification screen may be various pieces of information related to the display of the creator icon or the communication service, for example. However, the operation information obtained by the operation information obtaining unit 231 is not limited to the various pieces of information inputted on the contribution degree notification screen but may include information on various operation inputs performed by the creator on the creator terminal 10. For example, the operation information includes contribution action information on the contribution action that can be set by the above described contribution action setting unit 421. The operation information obtaining unit 131 transmits the obtained various pieces of information to the contribution action setting unit 421 and/or the communication service providing unit 426 of the contribution degree management server 40.

The display control unit 132 controls the display unit 120 and causes the display unit 120 to display various pieces of information. In the present embodiment, the display control unit 132 causes the display unit 120 to display the contribution degree notification screen. Note that, as described above, the display of the contribution degree notification screen can be controlled by the contribution degree notification screen display control unit 425 of the contribution degree management server 40. The display control unit 132 can cause the display unit 120 to display the contribution degree notification screen on the basis of various pieces of information transmitted from the contribution degree notification screen display control unit 425. Note that the display control unit 132 may further perform display control that is performed in a common information processing apparatus, such as the movement of the display of a pointer in a GUI, on the basis of the operation information obtained by the operation information obtaining unit 131, for example.

The functional configurations of apparatuses included in the contribution degree management system 1 according to an embodiment of the present disclosure have been described above with reference to FIG. 3. As described above, in the present embodiment, the contribution action detecting unit 422 detects the contribution action representing a contribution from the user to the creator. Further, the contribution degree giving unit 423 gives the contribution degree to the user in accordance with the contribution action, and the virtual distance setting unit 424 sets the virtual distance which is the virtual distance between the user and the creator on the basis of the integrated value of the given contribution degree for each user. Further, the contribution degree notification screen display control unit 425 controls the display of the contribution degree notification screen on which the set virtual distance is visually expressed, so that the contribution degree is notified to the user. Accordingly, the user can visually feel the sense of distance between the user and the creator by checking the display of the contribution degree notification screen, and accordingly, the user can recognize the degree of contribution from the user to the creator intuitively.

Further, in the present embodiment, the contribution action for the user to obtain the contribution degree can be set by the creator. Accordingly, since an action that is more preferable for the current status of the creator can be set as the contribution action, the user is promoted to perform an action that is more preferable to the creator as the contribution action. Further, in the present embodiment, on the basis of history of operation information of the user, for example, an action that interests the user is anticipated and the action can be set as the contribution action. Accordingly, since an action that is more preferable to the interest of the user can be set as the contribution action, the user is more promoted to perform the contribution action.

<3. Display Examples of Contribution Degree Notification Screen>

Next, display examples of the contribution degree notification screen according to an embodiment of the present disclosure will be described with reference to FIG. 4 to FIG. 8. FIG. 4 to FIG. 8 each show a display example of the contribution degree notification screen according to the present embodiment. Note that the display of the contribution degree notification screen shown in FIG. 4 to FIG. 8 and in FIG. 9 and FIG. 10, which will be described later, can be controlled by the contribution degree notification screen display control unit 425. Further, in FIG. 4 to FIG. 10, examples of the contribution degree notification screen displayed by the display unit 220 of the user terminal 20 are shown.

Figure 4:
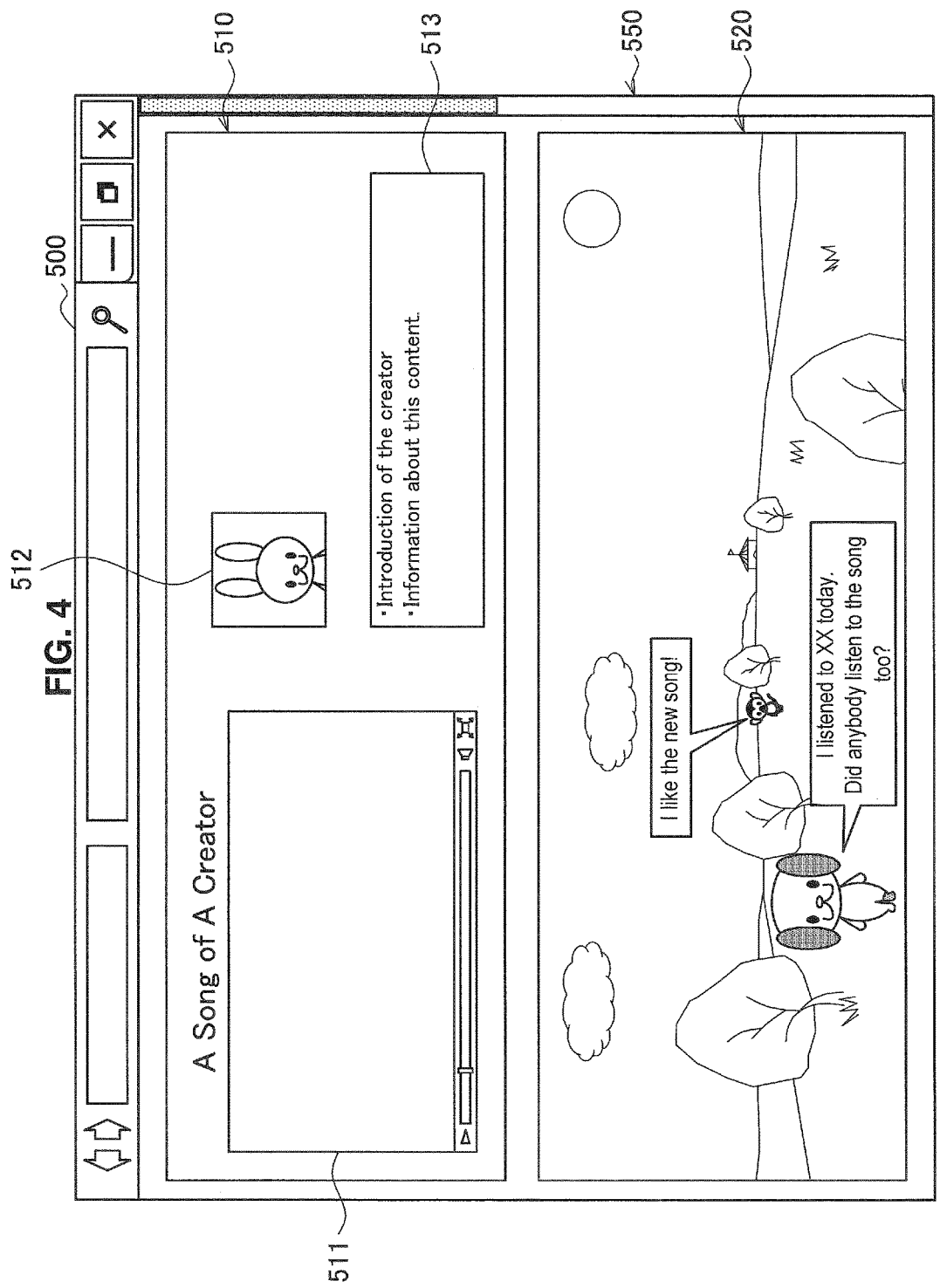
FIG. 4 shows a display example of a contribution degree notification screen according to an embodiment.

Referring to FIG. 4, a contribution degree notification screen 500 includes a content reproduction area 510 and a contribution degree notification area 520. In the content reproduction area 510, an image of reproduced content is displayed and also various pieces of information related to the content are displayed. In the example shown in FIG. 4, in the content reproduction area 510, a content image 511, creator information 512, and a comment box 513 are displayed.

The content image 511 is, for example, an image of content transmitted from the content sharing server 30 to the user terminal 20 in accordance with a request from a user. In a case in which the content does not include an image, such as music content, as the content image 511, for example, an image corresponding to the music content may be provided from the content sharing server 30 to be displayed or a visual effect image generated in the content sharing server 30 or the user terminal 20 may be displayed. Alternatively, the content reproduction area 510 may not include the content image 511.

The creator information 512 is information on the creator of the target content. In the example shown in FIG. 4, as the creator information 512, an image representing the creator is displayed. As the creator information 512, other information related to the creator, such as the name of the creator, may be displayed.

The comment box 513 displays comments posted by the creator with respect to the content. The comment may include self-introduction of the creator, general explanation of the content, and information on other content related to the reproduced content (e.g., a link to the other content produced by the creator).

In the contribution degree notification area 520, the virtual distance is visually expressed, so that the contribution degree is notified to the user. In the example shown in FIG. 4, for example, an operation on a scroll bar 550 causes the display of the contribution degree notification screen 500 to be scrolled so as to adjust an area that is mainly displayed on the display screen. Note that the present embodiment is not limited to this example, and the content reproduction area 510 and the contribution degree notification area 520 may be displayed as separate screens (e.g., as a content reproduction screen and the contribution degree notification screen), and a user's operation may switch the display of these screens. In the following description, the content reproduction area 510 is omitted in FIG. 5 to FIG. 10, and the display in the contribution degree notification area 520 will be mainly described.

Figure 5:
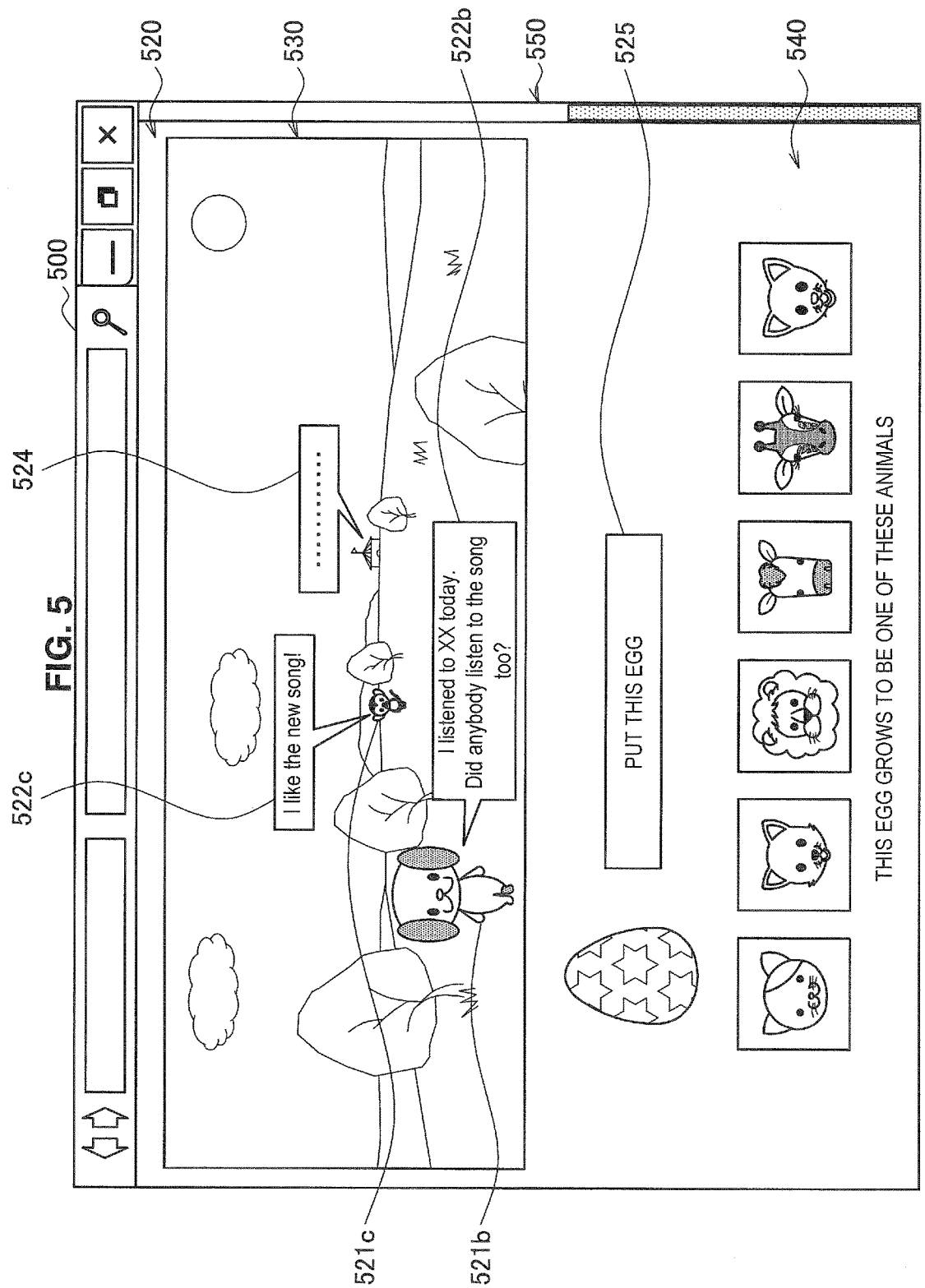
FIG. 5 shows a display example of a contribution degree notification screen according to an embodiment.

Referring to FIG. 5, the contribution degree notification area 520 includes a virtual distance display area 530 and an operation information display area 540. In the virtual distance display area 530, for example, a certain point on which the creator is located is set within the area, and a user icon representing a user is displayed in a manner that the virtual distance corresponds to the distance between the user icon and the certain point, so that the virtual distance is able to be visually expressed. Further, various pieces of information related to user's operation inputs on the contribution degree notification area 520 are displayed in the operation information display area 540. The various pieces of information related to user's operation inputs include, for example, information on the display of the user icon, information on messages in communication with other users and/or the creator, and the like.

FIG. 5 shows a display example of the contribution degree notification area 520 at an initial state. Here, the initial state means a state in which the user does not use the contribution degree management system 1 and the user has not participated in the virtual distance display area 530 yet. As shown in FIG. 5, in the state in which the user has not participated yet, the virtual distance display area 530 displays user icons 521b and 521c representing other users. In this manner, in the present embodiment, the user can refer to the contribution degree notification screen 500 even at the initial state and can check the other users' tendency, for example.

Further, as shown in FIG. 5, in the vicinity of the user icons 521b and 521c representing the other users, message boxes 522b and 522c displaying messages exchanged between the users are displayed. In the example shown in FIG. 5, the user icons 521b and 521c are animal-like icons, and the message boxes 522b and 522c are displayed in forms of balloons as if the user icons 521b and 521c are speaking. In this manner, in the present embodiment, messages between the users, which can be provided as the communication service, can be displayed in association with the user icons 521b and 521c. However, the present embodiment is not limited to the example shown in FIG. 5, and the user icons 521b and 521c may be icons having any shape. Further, the message boxes 522b and 522c may have any form as a display form, as long as the user who speaks a message can be identified as the speaker of the message.

In the present embodiment, the virtual distance between the creator and the user is visually expressed as the distance in the depth direction of the contribution degree notification screen 500. In the example shown in FIG. 5, the certain point at which the creator is located is set on a back side of the depth direction of the virtual distance display area 530, and the user icons 521b and 521c are displayed on a front side of the depth direction of the virtual distance display area 530 in a manner that the virtual distances correspond to distances between the certain point and the user icons 521b and 521c. In FIG. 5, since the user represented by the user icon 521c has a shorter virtual distance (that is, the integrated value of the contribution degree is larger) than the user represented by the user icon 521b, the user icon 521c is displayed on the back side of the depth direction.

Here, in the example shown in FIG. 5, the virtual distance setting unit 424 sets the virtual distances of the respective users on the basis of the relative evaluation of the integrated value of the contribution degree in comparison with other users. For example, the value of the virtual distance of a certain number of users having large integrated values of the contribution degrees in descending order is set to a value smaller than a certain value which is the threshold value for determining whether the user(s) has reached the creator or not. Further, the virtual distance setting unit 424 sets the virtual distances of the other users such that, on the basis of the user having the value of the virtual distance that is set to the value smaller than the certain value, a user having a larger integrated value of the contribution degree has a shorter virtual distance. The setting of the virtual distance of each user on the basis of the relative evaluation of the integrated value of the contribution degree in comparison with other users enables only a limited number of users to reach the creator, and accordingly, competitive consciousness for the contribution degree can be aroused among the users.

Further, as shown in FIG. 5, in the contribution degree notification area 520, a message box 524 displaying the creator's message may be displayed. However, the state shown in FIG. 5 is a state in which, as described above, the user has not participated yet, and the virtual distance between the user and the creator is relatively long, for example. Accordingly, in order to show that the distance between the user and the creator is relatively long, text may not be shown in the message box 524, as shown in FIG. 5. This shows a state in which the creator's voice is unlikely to reach the user because the virtual distance is relatively long. Alternatively, the state in which the creator's voice is unlikely to reach the user may be expressed as a display other than the example shown in FIG. 5, such as a display of text in the message box 524 in a small size. Further, even in a state in which the virtual distance is relatively long, a user's operation input, such as superimposition of a cursor (pointer) on the message box 524 or selection of the message box 524 by use of the cursor, may display the creator's message expressly. Note that the messages of the users and the creator displayed in the message boxes 522b, 522c, and 524 may be messages in the communication service provided by the above described communication service providing unit 426.

At the initial state, the operation information display area 540 may display a participation button 525 which promotes the user's participation. For example, the registration of account information by the user can cause the participation button 525 to be displayed. As described above, in the present embodiment, since the user icons 521b and 521c are animal-like icons, when the user presses the participation button 525, the user can also select a desired icon as the user icon from among animal-like icons that can be prepared by the contribution degree management system 1. In the example shown in FIG. 5, since the user icon is the animal-like icon, when the user icon is displayed for the first time, an icon like an egg of an animal may be displayed in the virtual distance display area 530 and the animal of the user icon specified by the user may be born from the egg. However, the present embodiment is not limited to this example, and the user icon may be set on the basis of a given image prepared by the user.

Figure 6:
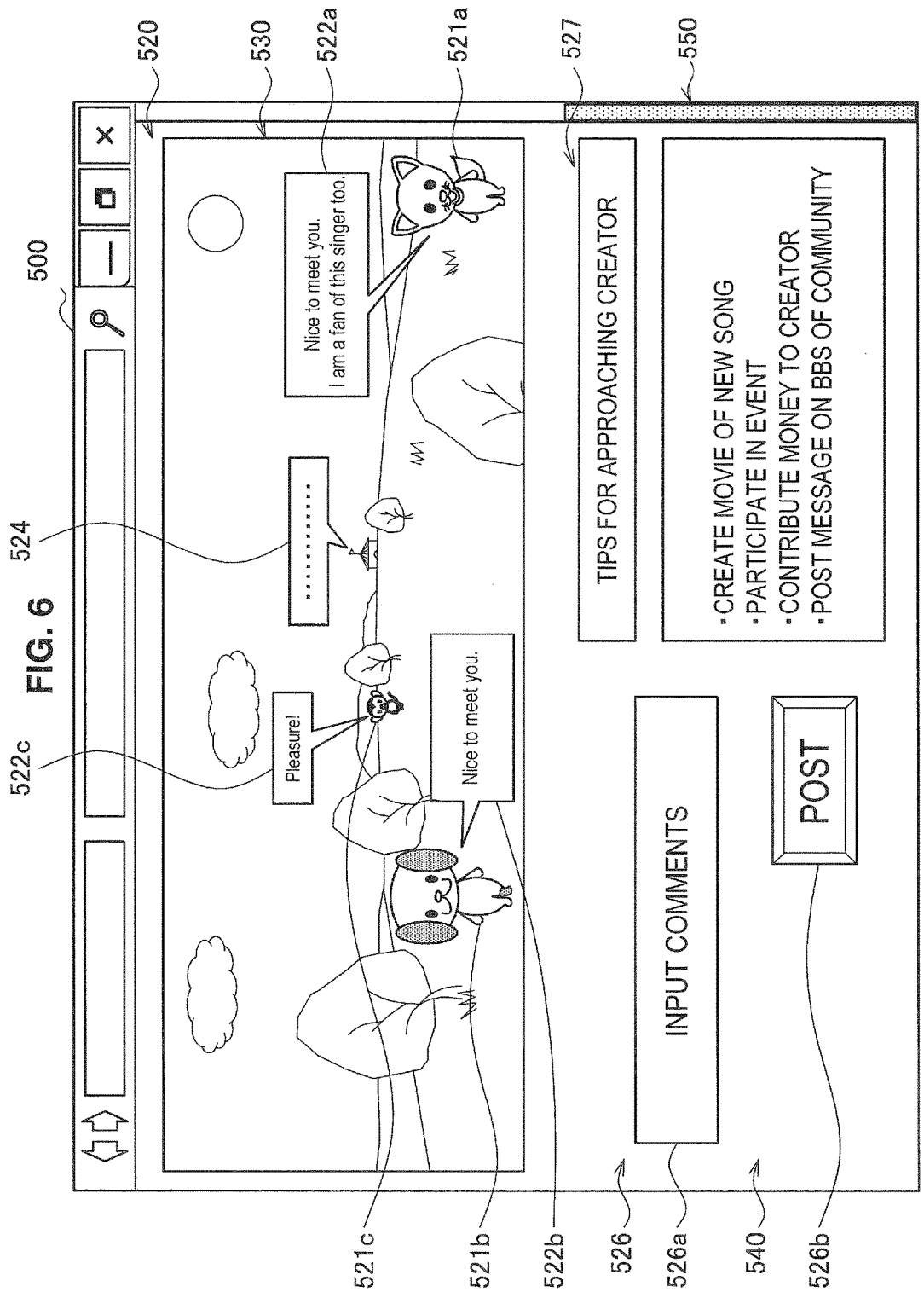
FIG. 6 shows a display example of a contribution degree notification screen according to an embodiment.

FIG. 6 shows a state in which the user starts using the contribution degree management system 1 and the user icon selected by the user is displayed in the virtual distance display area 530. In FIG. 6, unlike in the state shown in FIG. 5, a user icon 521a representing the user is displayed in the virtual distance display area 530. The example shown in FIG. 6 is a state immediately after the user has registered with the contribution degree management system 1, and thus, the user icon 521a is displayed on the most front side of the virtual distance display area 530, that is, at a position having the longest virtual distance. Further, in the same manner as that of the other user icons 521b and 521c, in the vicinity of the user icon 521a, a message box 522a is displayed in a form of a balloon so as to show the state in which the user icon 521a speaks.

As shown in FIG. 6, in the state in which the user has participated in the virtual distance display area 530, the operation information display area 540 may display communication information 526 and contribution action information 527. The communication information 526 includes, for example, a message input box 526a and a post button 526b. To the message input box 526a, character information can be inputted in accordance with an operation input performed by the user, and pressing the post button 526b causes the message to be transmitted to the other users and/or the creator. The transmitted message is displayed in the message box 522a, for example, as a speech of the user icon 521a.

The contribution action information 527 is information on the contribution action by which the contribution degree is given. As the contribution action information 527, the contribution action set by the contribution action setting unit 421 may be displayed in a form of a list. In the present embodiment, the contribution action can be specified by the creator. For example, the creator can set, as the contribution action, an action in accordance with the creator's need, such as participation in a latest event or viewing of content that has been produced recently. In this manner, the action in accordance with the creator's intention can be set as the contribution action, and the contribution action is displayed in the operation information display area 540 as the contribution action information 527, producing the effects of arousing the action from the user. Note that the communication information 526 and the contribution action information 527 may not be displayed constantly in the operation information display area 540, and may be displayed in accordance with an operation such as selection of a specific area or superimposition of a cursor on a specific area.

Figure 7:
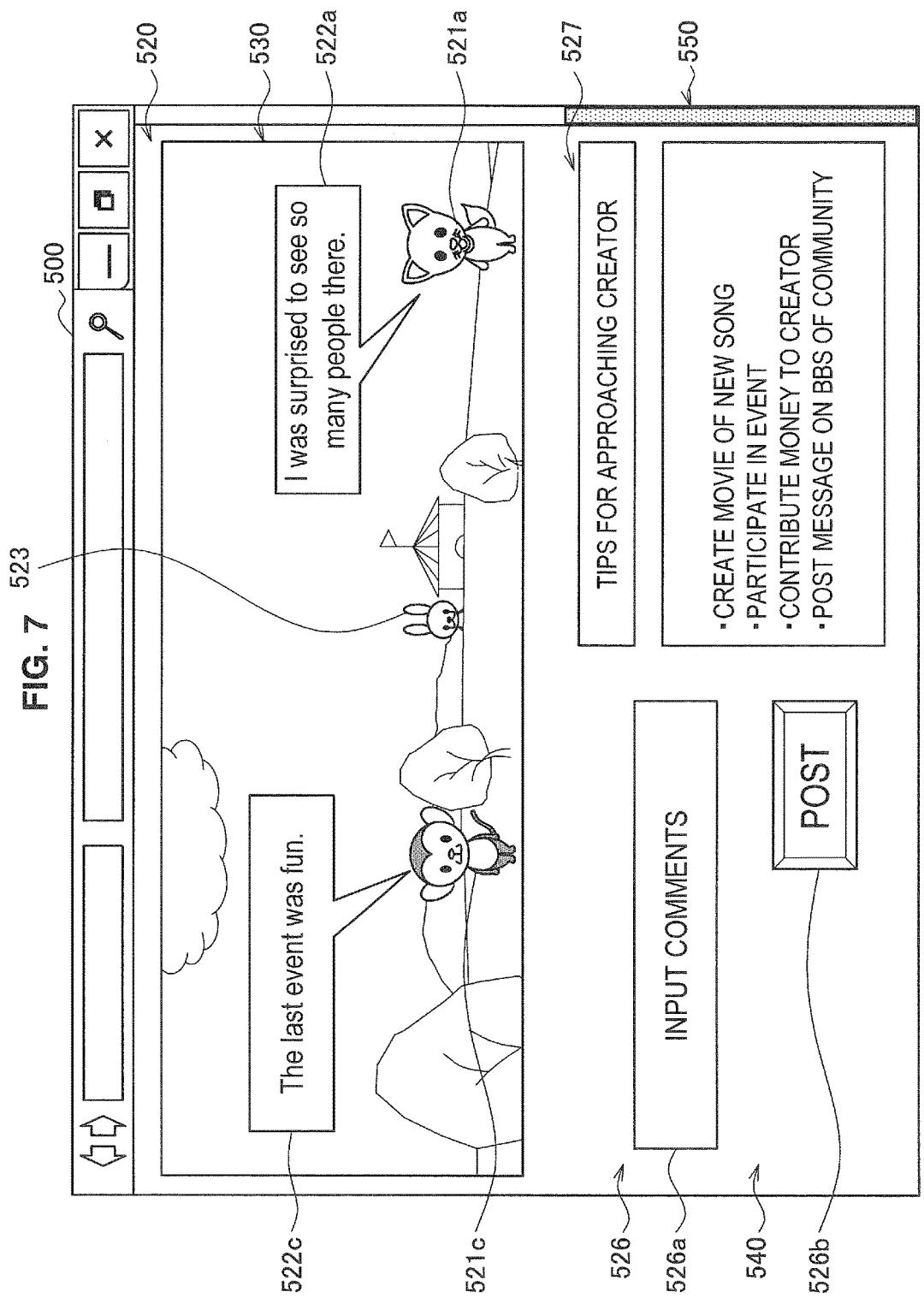
FIG. 7 shows a display example of a contribution degree notification screen according to an embodiment.

FIG. 7 shows a display of the contribution degree notification area 520 in a state in which the user has performed a certain contribution action and the contribution degree is given to the user, unlike in the state shown in FIG. 6. The contribution degree given to the user increases the integrated value of the contribution degree of the user, and accordingly, the virtual distance becomes shorter. In accordance with the change in the virtual distance, the display in the virtual distance display area 530 is changed. In the example shown in FIG. 7, the display of the user icon 521b of the other user having substantially the same virtual distance in the state shown in FIG. 6 disappears, and the display of the user icon 521c of the other user having a shorter virtual distance becomes larger. Further, in the example shown in FIG. 7, a creator icon 523 representing the creator, which is not displayed in the state shown in FIG. 6, is displayed at a certain point where the creator is set to be located. In this manner, in the present embodiment, in a case in which the value of the virtual distance of the user is smaller than a certain value, the contribution degree notification screen display control unit 425 may cause the creator icon 523 to be displayed on the contribution degree notification screen. In the present embodiment, the change in the virtual distance can be visually expressed by a change in relative sizes of the user icons 521*b* and 521*c* of the other users or a change in the display of the creator icon 523 representing the creator. However, the present embodiment is not limited to this example, and for example, the change in the virtual distance can be visually expressed by a change in the display of a background displayed in the virtual distance display area 530, for example.

Figure 8:
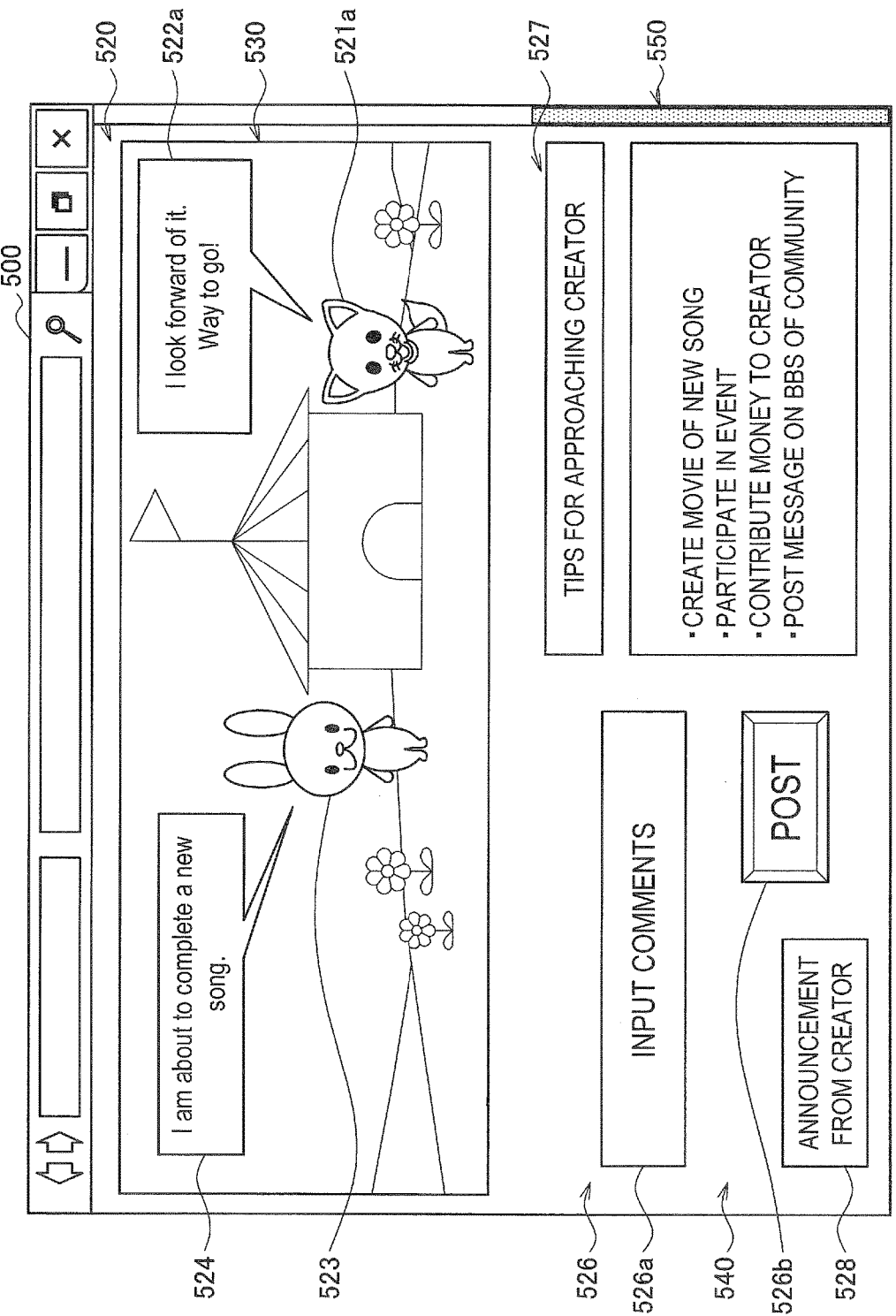
FIG. 8 shows a display example of a contribution degree notification screen according to an embodiment.

FIG. 8 shows a display of the contribution degree notification area 520 in a state in which the user has reached the creator as a result of more certain contribution actions performed by the user and more contribution degrees given to the user, from the state shown in FIG. 7. In FIG. 8, in order to express that the user has reached the creator, the creator icon 523 is displayed more largely than in the state shown in FIG. 7. Further, in the present embodiment, as described above, in a case in which the value of the virtual distance is smaller than the certain value which is the threshold value for determining whether or not the user has reached the creator (that is, in a case in which the user has reached the creator), the communication service providing unit 426 may provide a communication service to the creator and the user. In the example shown in FIG. 8, a state in which the user and the creator exchange messages directly is shown. Further, similarly, in a case in which the value of the virtual distance is smaller than the certain value, news information 528 which is a notification from the creator to the user may be displayed in a part of the contribution degree notification area 520 (in the operation information display area 540 in the example shown in FIG. 8). The news information 528 may be information which only users having a distance that is shorter than or equal to a certain distance to the creator are allowed to know, and may be secret information that can be inputted by the creator, for example. In FIG. 8, only a button is displayed as the news information 528, and for example, an operation such as selection of the button or superimposition of a cursor on the button can cause detailed content to be displayed. However, the news information 528 may be constantly displayed in the contribution degree notification area 520.

The above described news information 528 can be said to be a privilege from the creator to the user, which is given because the user has shortened the virtual distance, that is, the user has obtained a large contribution degree. In this manner, the user is given the privilege by obtaining the contribution degree, thereby being able to increase a motivation to perform the contribution action. Such a privilege may be anything other than the news information 528, and may be an intangible such as a right to view new content produced by the creator before other users or a preferential participation right in an event related to the creator, or a tangible such as a product that can be prepared by the creator. The privilege can be set as appropriate by the creator.

The display examples of the contribution degree notification screen according to an embodiment of the present disclosure have been described above with reference to FIG. 4 to FIG. 8. As described above, in the present embodiment, in the contribution degree notification screen 500, the virtual distance between the user and the creator is visually expressed. In the examples shown in FIG. 4 to FIG. 8, the virtual distance can be visually expressed as the distance in the depth direction of the contribution degree notification screen 500. Specifically, a user icon representing a user having a shorter virtual distance is displayed smaller than a user icon representing a user having a longer virtual distance, and accordingly, the virtual distance is visually expressed as the distance in the depth direction of the contribution degree notification screen 500.

Further, in the examples shown in FIG. 4 to FIG. 8, the user icons 521*a* to 521*c* representing the users are displayed on the front side of the depth direction of the contribution degree notification screen 500 and the certain point at which the creator is located is set on the back side of the depth direction, and thus, by the change in the size of the display of the creator icon 523 representing the creator, the virtual distance is visually expressed as the distance in the depth direction of the contribution degree notification screen 500. Alternatively, by a change in the display of the background of the virtual distance display area 530 in which the user icons 521*a* to 521*c* and/or the creator icon 523 are displayed, the virtual distance may be visually expressed as the distance in the depth direction of the contribution degree notification screen 500. In this manner, in the contribution degree notification screen 500, since the degree of contribution to the creator is visually expressed as the virtual distance, the user can recognize the contribution degree intuitively. Further, by accumulating the contribution degree, the user can become closer to the creator icon 523 on the contribution degree notification screen 500, that is, the virtual distance becomes shorter, and accordingly, the user can have a sense of accomplishment of the contribution degree, which promotes more contribution actions.

In the present embodiment, in a case in which the value of the virtual distance is smaller than a certain value, a communication service can be provided to the creator and the user. Further, in the present embodiment, in a case in which the value of the virtual distance is smaller than a certain value, the news information 528 can be provided to the user from the creator. Accordingly, a user having the value of the virtual distance smaller than the certain value (that is, a user who has accumulated the contribution degree that is larger than or equal to the certain degree) can know information that only the creator is allowed to know, such as an event in the process of producing content or the concept of a new work, owing to the communication service or the news information 528. In this manner, communication with the creator or information related to the creator is provided to users having the value of the virtual distance smaller than the certain value, thereby further promoting the execution of the contribution action of the user.

Here, in the examples shown in FIG. 4 to FIG. 8, the case has been described in which the virtual distance is visually expressed as the distance in the depth direction of the contribution degree notification screen 500 and the creator is located at the certain point on the back side of the depth direction. In this case, a user who refers to the contribution degree notification screen 500 can feel as if the user is located on the front side of the contribution degree notification screen 500 and is going to advance to the back of the screen as the virtual distance becomes shorter, which can be said to be a display on a user's viewpoint. Here, the present embodiment is not limited to this example, and for example, the virtual distance may be visually expressed as the distance in the depth direction of the contribution degree notification screen 500 and the creator may be located at a certain point on the front side of the depth direction. In this case, a user referring to the contribution degree notification screen 500 can feel as if the user is located on the back side of the contribution degree notification screen 500 and is going to advance to the front of the screen as the virtual distance becomes shorter, which can be said to be a display on a creator's viewpoint.

Figure 9:
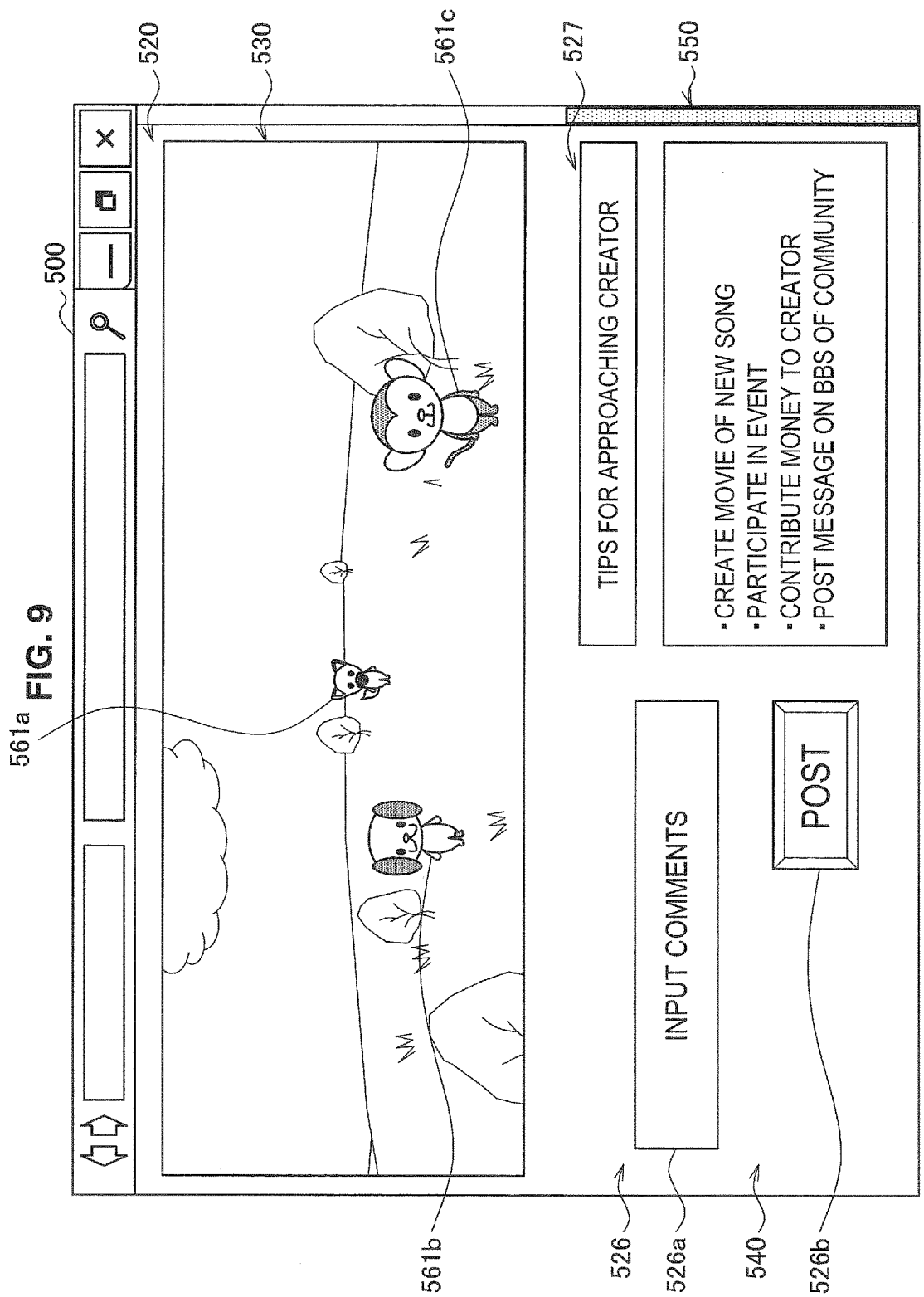
FIG. 9 shows a display example of a contribution degree notification screen according to an embodiment.
Figure 10:
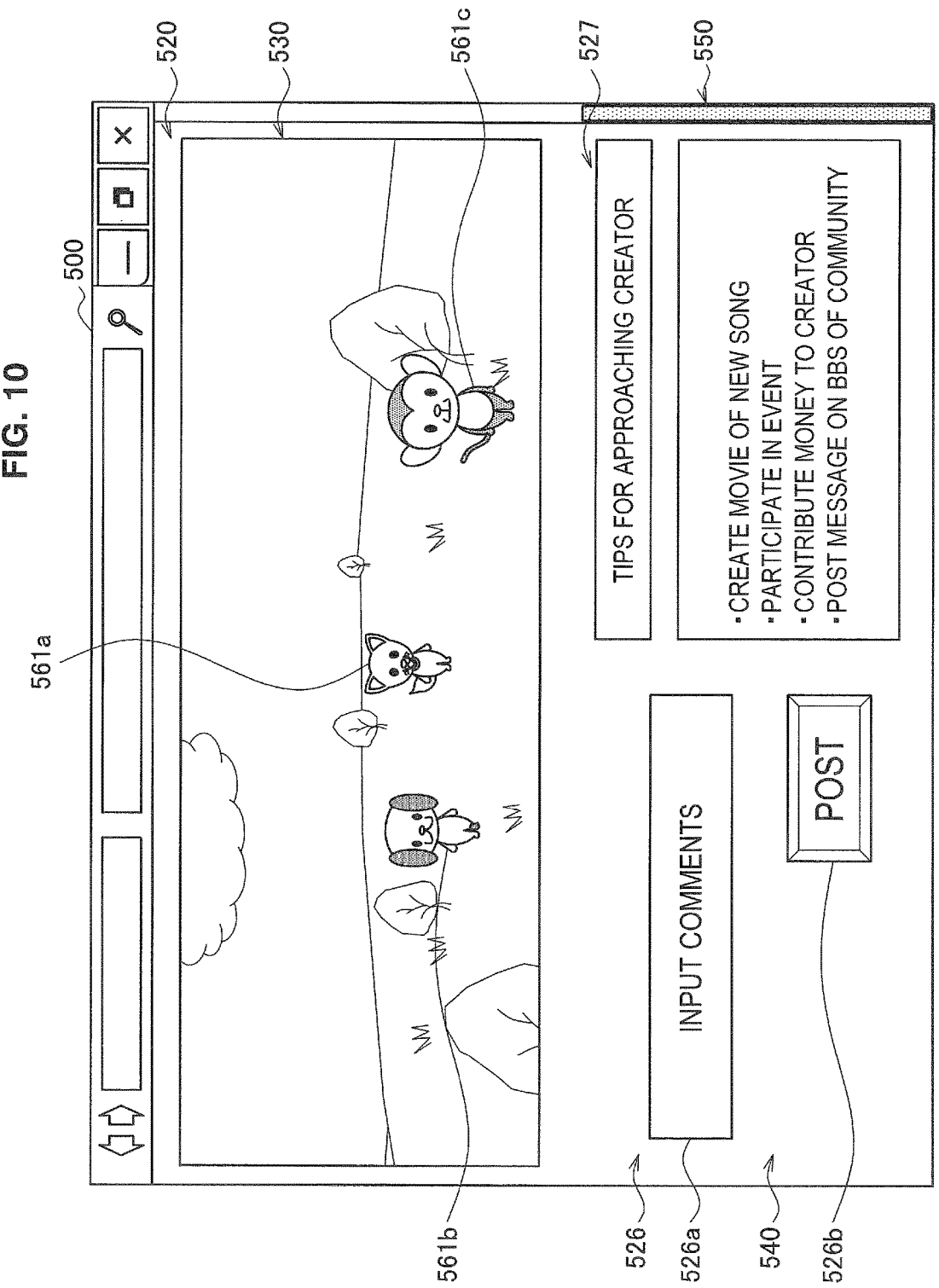
FIG. 10 shows a display example of a contribution degree notification screen according to an embodiment.

Display examples of the contribution degree notification screen in a case in which such a display on the creator's viewpoint will be described with reference to FIG. 9 and FIG. 10. FIG. 9 and FIG. 10 show modification examples of the contribution degree notification screen according to the present embodiment. Note that in the modification examples shown in FIG. 9 and FIG. 10, the display in areas other than the virtual distance display area 530 is the same as that in the embodiment described with reference to FIG. 4 to FIG. 8, and therefore, a detailed description thereof is omitted.

Referring to FIG. 9, in the virtual distance display area 530, user icons 561a, 561b, and 561c corresponding to a plurality of users are displayed. Note that in the example shown in FIG. 9, unlike in the embodiment shown in FIG. 4 to FIG. 8, the user icon 561a representing a user who refers to the contribution degree notification screen 500 is displayed on the back side of the depth direction of the virtual distance display area 530. The user icons 561b and 561c represent other users.

Further, FIG. 10 shows the display of the contribution degree notification area 520 in a state in which the user performs a certain contribution action and the contribution degree is given to the user, from the state shown in FIG. 9. The contribution degree given to the user increases the integrated value of the contribution degree of the user, and accordingly, the virtual distance becomes shorter. In the example shown in FIG. 10, in accordance with the change in the virtual distance, the display in the virtual distance display area 530 is changed in a manner that the size of the user icon 561a representing the user becomes larger. In this manner, in this modification example, the decrease in the virtual distance can be expressed by a larger display of the size of the user icon 561a.

The display examples of the contribution degree notification screen in a case in which the display in the creator's viewpoint is performed has been described above with reference to FIG. 9 and FIG. 10 as a modification example of the present embodiment. Note that the present embodiment is not limited to this example, and the virtual distance may be expressed as a direction other than the depth direction of the contribution degree notification screen 500. For example, the contribution degree notification screen display control unit 425 may visually express the virtual distance as a distance in a vertical direction or a horizontal direction of the contribution degree notification screen 500. Even in a case in which the virtual distance is expressed as the distance in the vertical direction or the horizontal direction of the contribution degree notification screen 500, the change in the relative display positions of the user icon representing the user and the user icon representing other users, the relative display positions of the user icon representing the user and the creator icon representing the creator, the display of the background, or the like, can change the virtual distance and it can be expressed that the user becomes closer to or more distant from the creator. In this manner, even in a case in which the virtual distance is displayed in the creator's viewpoint on the contribution degree notification screen 500 or a case in which the virtual distance is expressed as the distance in the direction other than the depth direction of the contribution degree notification screen 500, as described above, the user can recognize the contribution degree of the user intuitively and also obtains the effects of feeling the sense of accomplishment of obtaining the contribution degree.

Note that the case in which the contribution degree notification screen 500 includes the content reproduction area 510 and the contribution degree notification area 520 has been described above; however, the present embodiment is not limited to this example. The contribution degree notification screen 500 may include areas other than the content reproduction area 510 and the contribution degree notification area 520. For example, the contribution degree notification screen 500 may further include an area in which links to other content are displayed, such as other content produced by the creator of the content reproduced in the content reproduction area 510 or other content in which a large number of users participate in the virtual distance display area 530. In a case in which a link to other content is selected, the contribution degree notification screen 500 with respect to the other content may be displayed on the display unit 220 of the user terminal 20 and/or the display unit 120 of the creator terminal 10.

[4. Processing Procedure in System]

Figure 11:
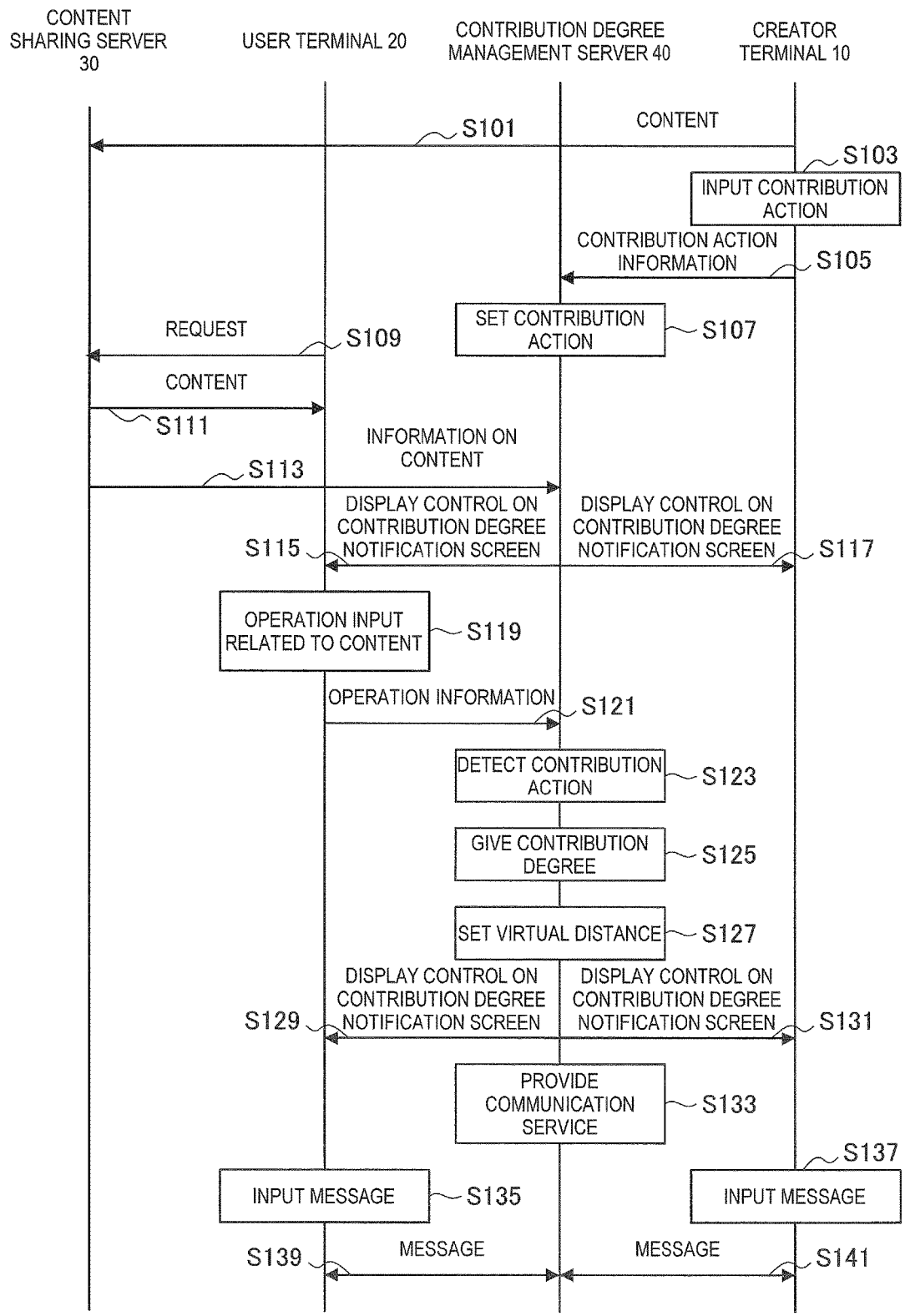
FIG. 11 is a flow chart showing a processing procedure in a contribution degree management system according to an embodiment.

Next, a processing procedure of various information processes performed in the contribution degree management system 1 shown in FIG. 1 will be described with reference to FIG. 11. FIG. 11 is a flow chart showing the processing procedure in the contribution degree management system 1 according to the present embodiment. In FIG. 11, various information processes in the creator terminal 10, the user terminal 20, the content sharing server 30, and the contribution degree management server 40 are shown in chronological order of the processes. Note that information can be transmitted and received between each apparatus through the network 50 shown in FIG. 1, for example, by use of each communication device (not shown in FIG. 3 in which functional configurations of apparatuses are shown) included in each apparatus.

In the contribution degree management system 1 according to the present embodiment, first, the creator terminal 10 registers content in the content sharing server 30 (step S101). Also, in the creator terminal 10, an operation input related to a contribution action is performed (step S103). In the process in the step S103, the operation information obtaining unit 131 can obtain contribution action information on the contribution action as information on operation performed by a creator, through the operation unit 110 of the creator terminal 10 shown in FIG. 3, for example. The obtained contribution action information is transmitted to the contribution degree management server 40 (step S105). In the contribution degree management server 40, for example, the contribution action setting unit 421 sets the contribution action on the basis of the received contribution action information (step S107). Note that the contribution action information may be in association with the content registered in the step S101, and the contribution action setting unit 421 may set the contribution action in association with the content in the step S107.

Next, the user terminal 20 transmits a request for content to the content sharing server 30 (step S109). In response to the request, the content sharing server 30 transmits the content desired by the user to the user terminal 20 (step S111). Note that in the processes shown in the step S109 and the step S111, processes of transmitting and receiving a request for content and the content in an existing common movie sharing system can be applied.

Next, the content sharing server 30 transmits, to the contribution degree management server 40, information on the content that is transmitted to the user terminal 20 in the step S111 (step S113). The information transmitted from the content sharing server 30 to the contribution degree management server 40 in the step S113 can be, for example, information by which the content can be identified, such as the register number attached to the content. The contribution degree management server 40 which has received the information on the content associates the content requested by the user with the contribution action in association with the content, and reflects such information on the contribution degree notification screen (step S115 and step S117). For example, the contribution degree notification screen display control unit 425 of the contribution degree management server 40 displays the content and the contribution action in association with the content on the contribution degree notification screen and on the display unit 220 of the user terminal 20 and/or the display unit 120 of the creator terminal 10. The content is displayed on the content reproduction region 510 of the contribution degree notification screen 500 shown in FIG. 4, for example. Further, the contribution action information is displayed on the operation information display region 540 of the contribution degree notification screen 500 as the contribution action information 527 as shown in FIG. 6 to FIG. 8, for example.

Next, an operation input related to the content is performed in the user terminal 20 (step S119). In the process in the step S119, for example, the operation information obtaining unit 231 can obtain various pieces of operation information of the user through the operation unit 210 of the user terminal 20 shown in FIG. 3. The obtained operation information is transmitted to the contribution degree management server 40 (step S121). In the contribution degree management server 40, the contribution action detecting unit 422 detects the contribution action from among the received pieces of operation information (step S123). Here, in the present embodiment, the contribution action is not limited to an action performed through the user terminal 20, and may be, for example, a user's action in the real world, such as participation in an event held by the creator. Accordingly, the operation input in the step S119 may be a report that the user has performed a contribution action, and in the step S123, the contribution action may be detected on the basis of this report. Further, in the step S123, for example, in a case in which a user performs a contribution action with another user, such as a joint-purchase of a product related to the creator with other users or joint participation in an event held by the creator with other users, the contribution action of the user may be detected on the basis of the operation information related to the contribution action of the other users.

Next, in the contribution degree management server 40, the contribution degree giving unit 423 gives the user the contribution degree in accordance with the detected contribution degree (step S125). In the process in the step S125, the contribution degree giving unit 423 may store information on the contribution degree given to the user in association with the user in the storage unit 410. The storage unit 410 can store the integrated value of the contribution degree given to the user within a certain period.

Next, in the contribution degree management server 40, the virtual distance setting unit 424 sets the virtual distance which is the virtual distance between the user and the creator on the basis of the integrated value of the contribution degree given to the user stored in the storage unit 410, for example (step S127). Then, the contribution degree notification screen display control unit 425 of the contribution degree management server 40 controls the display of the contribution degree notification screen in which the virtual distance is visually expressed each of in the user terminal 20 and the creator terminal 10 (step S129 and step S131). The display unit 220 of the user terminal 20 and/or the display unit 120 of the creator terminal 10 display the contribution degree notification screen under control of the contribution degree notification screen display control unit 425.

In the present embodiment, the communication service providing unit 426 of the contribution degree management server 40 can provide a communication service which enables communication between the user and other users and/or between the user and the creator on the contribution degree notification screen (step S133). In the communication service, messages are exchanged between the user and the creator, for example. Specifically, the user and the creator can input character information which is the messages via the operation units 110 and 210 (step 135 and step S137). The inputted character information is obtained as the operation information by the operation information obtaining units 131 and 231, and displayed on the contribution degree notification screen via the communication service providing unit 426 and the contribution degree notification screen display control unit 425, thereby being transmitted and received as messages between the creator terminal 10 and the user terminal 20 (step S139 and step S141).

The processing procedure of various kinds of information processing performed in the contribution degree management system 1 according to the present embodiment has been described above with reference to FIG. 11. As described above, in the present embodiment, the contribution degree notification screen with respect to the creator of the content is displayed to the user who has requested the content. Further, on the contribution degree notification screen, the contribution action to the creator, which can be set by the creator, is displayed. Accordingly, a user who views the content and becomes interested in the creator can be promoted to perform a contribution action. Further, the user who has performed the contribution action is given the contribution degree in accordance with the contribution action, and the given contribution degree is visually expressed on the contribution degree notification screen as the virtual distance which is the virtual distance between the user and the creator. To the user who has viewed the contribution degree notification screen, the contribution degree obtained by the user is notified in a form by which the user can recognize the contribution degree intuitively, and also, as described above with reference to FIG. 4 to FIG. 8, competitive consciousness for obtaining the contribution degree is aroused among the users. Here, a user who has requested the content in the content sharing system is assumed to be more or less interested in the content and the creator thereof. In the present embodiment, the user who has requested the content in the content sharing system is more effectively promoted to perform the contribution action to the creator because the contribution degree notification screen with respect to the creator of the content is displayed to the user.

<5. Hardware Configuration>

Figure 12:
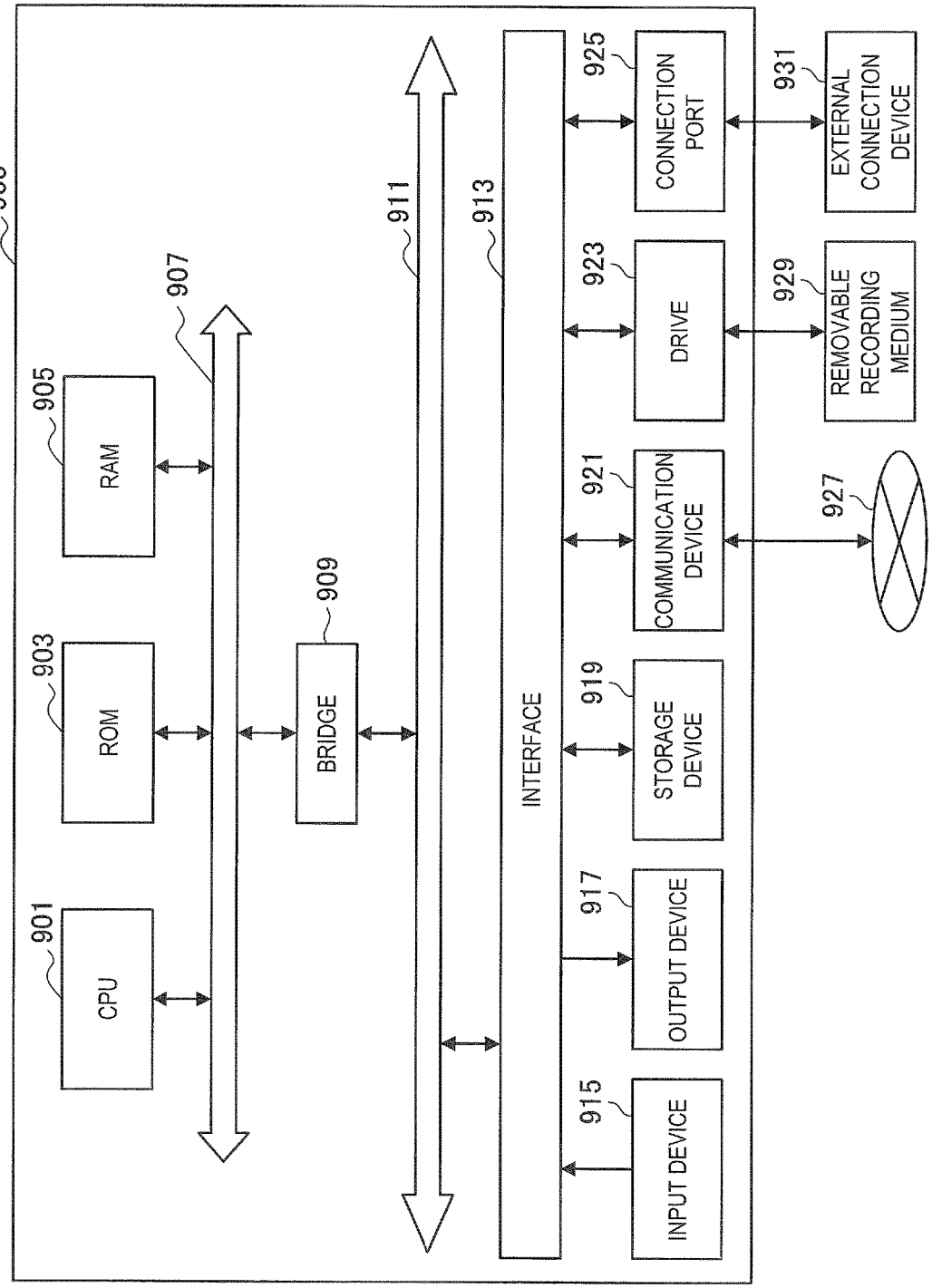
FIG. 12 is a block diagram showing a hardware configuration of an information processing apparatus according to an embodiment.

Next, a hardware configuration of the information processing apparatus according to the present embodiment will be described with reference to FIG. 12. FIG. 12 is a block diagram showing the hardware configuration of the information processing apparatus according to the present embodiment. Note that an information processing apparatus 900 shown in FIG. 12 can realize the creator terminal 10, the user terminal 20, the content sharing server 30, and the contribution degree management server 40 shown in any of FIG. 1, FIG. 3, and FIG. 11, for example.

The information processing apparatus 900 includes a CPU 901, read only memory (ROM) 903, and random access memory (RAM) 905. The information processing apparatus 900 may further include a host bus 907, a bridge 909, an external bus 911, an interface 913, an input device 915, an output device 917, a storage device 919, a communication device 921, a drive 923, and a connection port 925. The information processing apparatus 900 may include, instead of or along with the CPU 901, a processing circuit such as a digital signal processor (DSP) or an application specific integrated circuit (ASIC).

The CPU 901 functions as an arithmetic processing unit and a control unit and controls an entire operation or a part of the operation of the information processing apparatus 900 according to various programs recorded in the ROM 903, the RAM 905, the storage device 919, or a removable recording medium 929. The ROM 903 stores programs and arithmetic parameters used by the CPU 901. The RAM 905 temporarily stores programs used in execution of the CPU 901 and parameters and the like used during the execution. The CPU 901, the ROM 903, and the RAM 905 are connected to each other via the host bus 907 configured from an internal bus such as a CPU bus or the like. In addition, the host bus 907 is connected to the external bus 911 such as a peripheral component interconnect/interface (PCI) bus via the bridge 909. The CPU 901 corresponds to any of the control units 130, 230, and 420 of the creator terminal 10, the user terminal 20, and the contribution degree management server 40, for example, in the present embodiment.

The host bus 907 is connected to an external bus 911 such as a peripheral component interconnect/interface (PCI) bus through the bridge 908.

The input device 915 is configured by a device operated by a user, such as a mouse, a keyboard, a touch panel, buttons, a switch, and a lever. Also, the input device 915 may be a remote control device using, for example, infrared light or other radio waves, or may be an external connection device 931 such as a mobile phone or a PDA compatible with the operation of the information processing apparatus 900. The input device 915 includes an input control circuit that generates an input signal on the basis of information inputted by the user by use of the above described operation means and outputs the input signal to the CPU 901, for example. The user of the information processing apparatus 900 can input various kinds of data to the information processing apparatus 900 and can instruct the information processing apparatus 900 to perform a processing operation by operating the input device 915. The input device 915 corresponds to any of the operation unit 110 and the operation unit 210 of the creator terminal 10 and the user terminal 20, for example, in the present embodiment.

The output device 917 is configured by a device capable of visually or aurally notifying the user of obtained information. For example, the output device 917 may be a display device such as a CRT display, a liquid crystal display, a plasma display, an EL display, or a lamp; an audio output device such as a speaker and headphones; or a printer. The output device 917 outputs results obtained by the processing performed by the information processing apparatus 900, for example. Specifically, the display device displays visually the results obtained by the processing performed by the information processing apparatus 900 in any of various forms such as a text, an image, a table, and a graph. The display device corresponds to the any of the display unit 120 and the display unit 220 of the creator terminal 10 and the user terminal 20, for example, in the present embodiment. On the other hand, the audio output device outputs aurally an audio signal such as reproduced sound data or acoustic data being converted into an analog signal.

The storage device 919 is a device for storing data configured as an example of a storage unit of the information processing apparatus 900. The storage device 919 is configured by, for example, a magnetic storage device such as a HDD, a semiconductor storage device, an optical storage device, or a magneto-optical storage device. This storage device 919 stores programs to be executed by the CPU 901, various data, and various data obtained from the outside. The storage device 919 corresponds to the storage unit 410 of the contribution degree management server 40, for example, in the present embodiment.

The communication device 921 is a communication interface configured by, for example, a communication device for establishing a connection to a communication network 927. The communication device 921 is, for example, a wired or wireless local area network (LAN), Bluetooth (registered trademark), a communication card for wireless USB (WUSB), or the like. Alternatively, the communication device 921 may be a router for optical communication, a router for asymmetric digital subscriber line (ADSL), a modem for various communications, or the like. The communication device 921 can transmit and receive signals and the like using a given protocol such as TCP/IP on the Internet and with other communication devices, for example. The network 927 connected to the communication device 921 is configured by a network and the like, which is connected via wire or wirelessly, and is, for example, the Internet, a home-use LAN, infrared communication, radio wave communication, and satellite communication. In the present embodiment, for example, various pieces of information processed in each step shown in FIG. 11 can be transmitted and received between or among apparatuses through the network 927 by the communication device 921.

The drive 923 is a reader/writer for the removable recording medium and is built in or externally attached to the information processing apparatus 900. The drive 923 reads out information recorded on the attached removable recording medium 929, such as a magnetic disk, an optical disk, a magneto-optical disk, or a semiconductor memory, and outputs the information to the RAM 905. Further, the drive 923 can write information on the attached removable recording medium 929, such as a magnetic disk, an optical disk, a magneto-optical disk, or a semiconductor memory. Examples of the removable recording medium 929 include a DVD medium, an HD-DVD medium, a Blu-ray (registered trademark) medium. Alternatively, the removable recording medium 929 may be a Compact Flash (CF, registered trademark), a flash memory, a secure digital memory card (SD memory card), or the like. Further alternatively, the removable recording medium 929 may be, for example, an integrated circuit card (IC card) on which a contactless IC chip is mounted, an electronic device, or the like. In the present embodiment, for example, various pieces of information processed in each step shown in FIG. 11 may be read out from the removable recording medium 929 or written into the removable recording medium 929 by the drive 923.

The connection port 925 is a port for allowing devices to directly connect to the information processing apparatus 900. Examples of the connection port 925 include a universal serial bus (USB) port, an IEEE1394 port, and a small computer system interface (SCSI) port. Other examples of the connection port 925 may include an RS-232C port, an optical audio terminal, and a high-definition multimedia interface (HDMI, registered trademark) port. The connection of the external connection device 931 to the connection port 925 may enable the information processing apparatus 900 to obtain the various data directly from the external connection device 931 or to provide the various data to the external connection device 931. In the present embodiment, for example, various pieces of information processed in each step shown in FIG. 11 may be obtained from the external connection device 931 or outputted to the external connection device 931 via the connection port 925.

The example of the hardware configuration that can realize the functions of the information processing apparatus 900 according to an embodiment of the present disclosure has been described above. Each structural element described above may be formed by a common member or configured by hardware having a special function of each structural element. Accordingly, it is possible to change the hardware configuration to be used as appropriate depending on technique levels when the present embodiment is executed.

Note that it is possible to create a computer program for realizing each function of the above described information processing apparatus 900 according to the present embodiment and to incorporate the program in a PC or the like. Further, it is possible to provide a computer-readable recording medium having such a computer program stored therein. The recording medium may be, for example, a magnetic disk, an optical disk, a magneto-optical disk, or a flash memory. Further, the computer program may be distributed through a network, for example, without using the recoding medium.

<6. Supplementary Explanation>

Although the preferred embodiments of the present disclosure have been described in detail with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

The effects described in the specification are just explanatory or exemplary effects, and are not limiting. That is, the technology according to the present disclosure can exhibit other effects that are apparent to a person skilled in the art from the descriptions in the specification, along with the above effects or instead of the above effects.

For example, the above embodiment has shown the case in which the contribution degree management system 1 is used for the content sharing system and the target of the contribution action performed by the user is the creator of the content; however, the present technology is not limited to this example. The contribution degree management system according to the present embodiment can be used for any other system which can generate a situation in which the user reaches the target in accordance with the degree of contribution to the target. For example, the contribution degree management system 1 according to the present embodiment can be used for such a variety of games that a certain item can be acquired or a certain event occurs in a case in which certain conditions are satisfied. In this case, the item or the event is the target, and satisfaction of the conditions for the acquirement of the item or the occurrence of the event corresponds to the execution of the contribution action. On the contribution degree notification screen, the degree of accomplishment (the degree of contribution) expected to acquire the item or to generate the event is visually expressed as the virtual distance, and accordingly, the user can recognize the degree of accomplishment intuitively. Further, by accumulating the degree of accomplishment, the user becomes closer to the target, that is, the virtual distance becomes shorter, on the contribution degree notification screen, and accordingly, the user can have the sense of accomplishment for accumulating the accomplishment degree, and more contribution actions are promoted.

Additionally, the present technology may also be configured as below.

(1) An information processing apparatus including:
a contribution action detecting unit configured to detect a contribution action representing a contribution from a user to a target;
a contribution degree giving unit configured to give the user a contribution degree in accordance with the contribution action;
a virtual distance setting unit configured to set a virtual distance which is a virtual distance between the user and the target on the basis of an integrated value of the given contribution degree of the user; and
a contribution degree notification screen display control unit configured to control a display of a contribution degree notification screen in which the set virtual distance is visually expressed.

(2) The information processing apparatus according to (1),
wherein the contribution degree notification screen display control unit visually expresses the virtual distance by displaying a user icon representing the user in a manner that the virtual distance corresponds to a distance between the user icon and a certain point on which the target is located.

(3) The information processing apparatus according to (1) or (2),
wherein the contribution degree giving unit gives the contribution degree to a plurality of users, and
wherein the virtual distance setting unit sets the virtual distance as a relative value between each of the plurality of users and the target on the basis of an integrated value of the contribution degree for each of the users.

(4) The information processing apparatus according to any one of (1) to (3),
wherein the contribution degree notification screen display control unit displays, on the contribution degree notification screen, a plurality of user icons representing a plurality of the users having an integrated value of the contribution degree within a certain range.

(5) The information processing apparatus according to any one of (1) to (4), further including:
a communication service providing unit configured to provide a communication service to the plurality of users having the virtual distance at least within a certain range.

(6) The information processing apparatus according to (5),
wherein the communication service providing unit provides at least an exchange of messages between or among the plurality of users, and
wherein the contribution degree notification screen display control unit displays, on the contribution degree notification screen, the messages in association with the user icons representing the plurality of users.

(7) The information processing apparatus according to any one of (1) to (6),
wherein the contribution notification screen display control unit visually expresses the virtual distance as a distance in a depth direction of the contribution degree notification screen.

8) The information processing apparatus according to (7),
wherein the contribution degree notification screen display control unit visually expresses the virtual distance as the distance in the depth direction of the contribution degree notification screen by displaying a user icon representing a user having a shorter virtual distance smaller than a user icon representing a user having a longer virtual distance.

(9) The information processing apparatus according to any one of (1) to (8),
wherein the contribution degree notification screen display control unit displays a target icon representing the target on the contribution degree notification screen in a case in which the virtual distance is shorter than a certain value.

(10) The information processing apparatus according to any one of (1) to (9), wherein the contribution degree notification screen display control unit visually expresses the virtual distance as the distance in the depth direction of the contribution degree notification screen by displaying the user icon representing the user on a front side of the depth direction of the contribution degree notification screen, setting a certain point on which the target is located on a back side of the depth direction, and changing a size of display of the target icon representing the target.

(11) The information processing apparatus according to any one of (1) to (9), wherein the contribution degree notification screen display control unit visually expresses the virtual distance as the distance in the depth direction of the contribution degree notification screen by displaying the user icon representing the user on a back side of the depth direction of the contribution degree notification screen, setting the certain point on which the target is located on a front side of the depth direction, and changing a size of display of the user icon.

(12) The information processing apparatus according to any one of (1) to (11), wherein the target is a creator of content in a content sharing system in which the content is shared by a plurality of the users.

(13) The information processing apparatus according to (12), further including:

a communication service providing unit configured to provide a communication service to the creator and the user in a case in which the virtual distance is shorter than a certain distance.

(14) The information processing apparatus according to (12) or (13), further including:

a contribution action setting unit configured to set the contribution action on the basis of an operation input performed by the creator.

(15) The information processing apparatus according to any one of (12) to (14), wherein the contribution action is an action of a contribution of money to the creator.

(16) An information processing method including:

detecting a contribution action representing a contribution from a user to a target;

giving the user a contribution degree in accordance with the contribution action;

setting a virtual distance which is a virtual distance between the user and the target on the basis of an integrated value of the given contribution degree for each user; and controlling, by a processor, a display of a contribution degree notification screen in which the set virtual distance is visually expressed.

(17) A program for causing a computer to realize:

a function of detecting a contribution action representing a contribution from a user to a target;

a function of giving the user a contribution degree in accordance with the contribution action;

a function of setting a virtual distance which is a virtual distance between the user and the target on the basis of an integrated value of the given contribution degree for each user; and a function of controlling a display of a contribution degree notification screen in which the set virtual distance is visually expressed.

What is claimed is:

1. An information processing apparatus, comprising:
a central processing unit (CPU); and
a memory storing instructions for execution by the CPU, wherein the CPU is configured to:
set a contribution action for a first user of a plurality of users, based on a history of operation information of the first user, wherein the operation information is associated with operation inputs of the first user on a contribution degree notification screen;
detect the contribution action representing a contribution from the first user to a target;
assign a contribution degree to the first user based on the contribution action;
set a virtual distance between the first user and the target based on an integrated value of the contribution degree of the first user;
control the contribution degree notification screen to concurrently display the target at a first position and the first user at a second position,
wherein the first position is at the set virtual distance from the second position,
wherein the set virtual distance, between the first user and the target, decreases based on an increase in the integrated value of the contribution degree of the first user; and
control the contribution degree notification screen to display a change in the set virtual distance between the first user and the target.

2. The information processing apparatus according to claim 1, wherein the CPU is further configured to:
control the contribution degree notification screen to display a user icon representing the first user such that the virtual distance corresponds to a distance between the user icon and a certain point on which the target is located; and
visually express the virtual distance on the contribution degree notification screen.

3. The information processing apparatus according to claim 1, wherein the CPU is further configured to:
assign the contribution degree to the plurality of users; and
set the virtual distance as a relative value between each of the plurality of users and the target, based on the integrated value of the contribution degree for each of the plurality of users.

4. The information processing apparatus according to claim 1, wherein the CPU is further configured to control the contribution degree notification screen to display a plurality of user icons, wherein the plurality of user icons represent the plurality of users having the integrated value of the contribution degree within a certain range.

5. The information processing apparatus according to claim 4, wherein the CPU is further configured to provide a communication service to the plurality of users having the virtual distance within the certain range.

6. The information processing apparatus according to claim 5, wherein the CPU is further configured to:
control at least an exchange of messages among the plurality of users; and
control the contribution degree notification screen to display the messages in association with the plurality of user icons representing the plurality of users.

7. The information processing apparatus according to claim 1, wherein the CPU is further configured to visually express the virtual distance as a distance in a depth direction of the contribution degree notification screen.

8. The information processing apparatus according to claim 7, wherein the CPU is further configured to:
control the contribution degree notification screen to display a first user icon, that represents the first user smaller than a second user icon that represents a second user of the plurality of users, wherein the virtual distance between the first user and the target is shorter than a virtual distance between the second user and the target; and
visually express the virtual distance of the first user and the virtual distance of the second user in the depth direction of the contribution degree notification screen based on the display of the first user icon smaller than the second user icon.

9. The information processing apparatus according to claim 7, wherein the CPU is further configured to control display of a target icon, representing the target, on the contribution degree notification screen based on the virtual distance that is shorter than a certain value.

10. The information processing apparatus according to claim 7, wherein the CPU is further configured to:
control the contribution degree notification screen to display a first user icon, that represents the first user, on a front side of the depth direction;
visually express the virtual distance as the distance in the depth direction of the contribution degree notification screen based on the display of the first user icon;
set a certain point, on which the target is located, on a back side of the depth direction; and
change a size of display of a target icon representing the target.

11. The information processing apparatus according to claim 7, wherein the CPU is further configured to:
control the contribution degree notification screen to display a first user icon, that represents the first user, on a back side of the depth direction;
visually express the virtual distance as the distance in the depth direction of the contribution degree notification screen based on the display of the first user icon;
set a certain point, on which the target is located, on a front side of the depth direction; and
change a size of display of the first user icon.

12. The information processing apparatus according to claim 1, wherein the target is a creator of content in a content sharing system in which the content is shared by the plurality of users.

13. The information processing apparatus according to claim 12, wherein the CPU is further configured to provide a communication service to the creator and the plurality of users based on the virtual distance that is shorter than a certain distance.

14. The information processing apparatus according to claim 12, wherein the CPU is further configured to set the contribution action based on an operation input by the creator.

15. The information processing apparatus according to claim 12, wherein the contribution action is an action of a contribution of money to the creator.

16. The information processing apparatus according to claim 1, wherein the CPU is further configured to set the contribution action for display on the contribution degree notification screen.

17. The information processing apparatus according to claim 1, wherein the CPU is configured to set, as the contribution action, at least one of an action of contribution of money to the target, an action of purchase of content created by the target, an action of advertisement of content created by the target on social media, or an action of participation in an event held by the target.

18. An information processing method, comprising:
in an information processing apparatus:
setting a contribution action for a user based on a history of operation information of the user, wherein the operation information is associated with operation inputs of the user on a contribution degree notification screen;
detecting the contribution action representing a contribution from the user to a target;
assigning a contribution degree to the user based on the contribution action;
setting a virtual distance between the user and the target based on an integrated value of the contribution degree of the user;
controlling the contribution degree notification screen to concurrently display the target at a first position and the user at a second position,
wherein the first position is at the set virtual distance from the second position,
wherein the set virtual distance, between the user and the target, decreases based on an increase in the integrated value of the contribution degree of the user; and
controlling, by a processor, the contribution degree notification screen to display a change in the set virtual distance between the user and the target.

19. A non-transitory computer-readable medium having stored thereon, computer-executable instructions for causing a computer to execute operations, the operations comprising:
setting a contribution action for a user based on a history of operation information of the user, wherein the operation information is associated with operation inputs of the user on a contribution degree notification screen;
detecting the contribution action representing a contribution from the user to a target;
assigning a contribution degree to the user based on the contribution action;
setting a virtual distance between the user and the target based on an integrated value of the contribution degree of the user,
controlling the contribution degree notification screen to concurrently display the target at a first position and the user at a second position,
wherein the first position is at the set virtual distance from the second position,
wherein the set virtual distance, between the user and the target, decreases based on an increase in the integrated value of the contribution degree of the user;
controlling the contribution degree notification screen to display a change in the set virtual distance between the user and the target.

* * * * *